(12) United States Patent
Neils et al.

(10) Patent No.: US 11,712,870 B2
(45) Date of Patent: Aug. 1, 2023

(54) PLATED LATTICE AND SYSTEMS AND METHODS FOR FORMING THEREOF

(71) Applicant: University of Virginia Patent Foundation, Charlottesville, VA (US)

(72) Inventors: Andrew Neils, Charlottesville, VA (US); Haydn N. G. Wadley, Keswick, VA (US)

(73) Assignee: University of Virginia Patent Foundation, Charlottlesville, VA (US)

( * ) Notice: Subject to any disclaimer, the term of this patent is extended or adjusted under 35 U.S.C. 154(b) by 0 days.

(21) Appl. No.: 17/104,719

(22) Filed: Nov. 25, 2020

(65) Prior Publication Data
US 2021/0154966 A1    May 27, 2021

Related U.S. Application Data

(60) Provisional application No. 62/940,022, filed on Nov. 25, 2019.

(51) Int. Cl.
  *B32B 3/12* (2006.01)
  *B32B 15/04* (2006.01)
  *B33Y 80/00* (2015.01)
  *B32B 18/00* (2006.01)
  *B32B 27/06* (2006.01)

(52) U.S. Cl.
  CPC ............... *B32B 3/12* (2013.01); *B32B 15/04* (2013.01); *B32B 18/00* (2013.01); *B32B 27/06* (2013.01); *B33Y 80/00* (2014.12)

(58) Field of Classification Search
  None
  See application file for complete search history.

(56) References Cited

U.S. PATENT DOCUMENTS

2016/0325520 A1* 11/2016 Berger ...................... E04B 1/28

OTHER PUBLICATIONS

Tancogne-Dejean et al., 3D Plate-Lattices: An Emerging Class of Low-Density Metamaterial Exhibiting Optimal Isotropic Stiffness, 2018, Advanced Materials (Year: 2018).*

* cited by examiner

*Primary Examiner* — Mary I Omori
(74) *Attorney, Agent, or Firm* — Finnegan, Henderson, Farabow, Garrett & Dunner, LLP

(57) ABSTRACT

A lattice structure includes multiple identical unit cells formed from joined plates. In the lattice structure, some of the plates are rectangular plates, some of the plates are triangular plates, and some of the plates are trapezoidal plates. Further, any two of the joined rectangular plates have corresponding surface normals perpendicular to each other and at least two edges of each one of the triangular plates are joined to one of a surface or an edge of one of the plurality of joined plates. Further, at least three edges of each one of the trapezoidal plates are joined to one of a surface or an edge of one of the plurality of joined plates, and any one of a plurality of surface normals for the triangular plates and the trapezoidal plates are nonparallel to any one of a plurality of surface normals of rectangular plates.

21 Claims, 32 Drawing Sheets

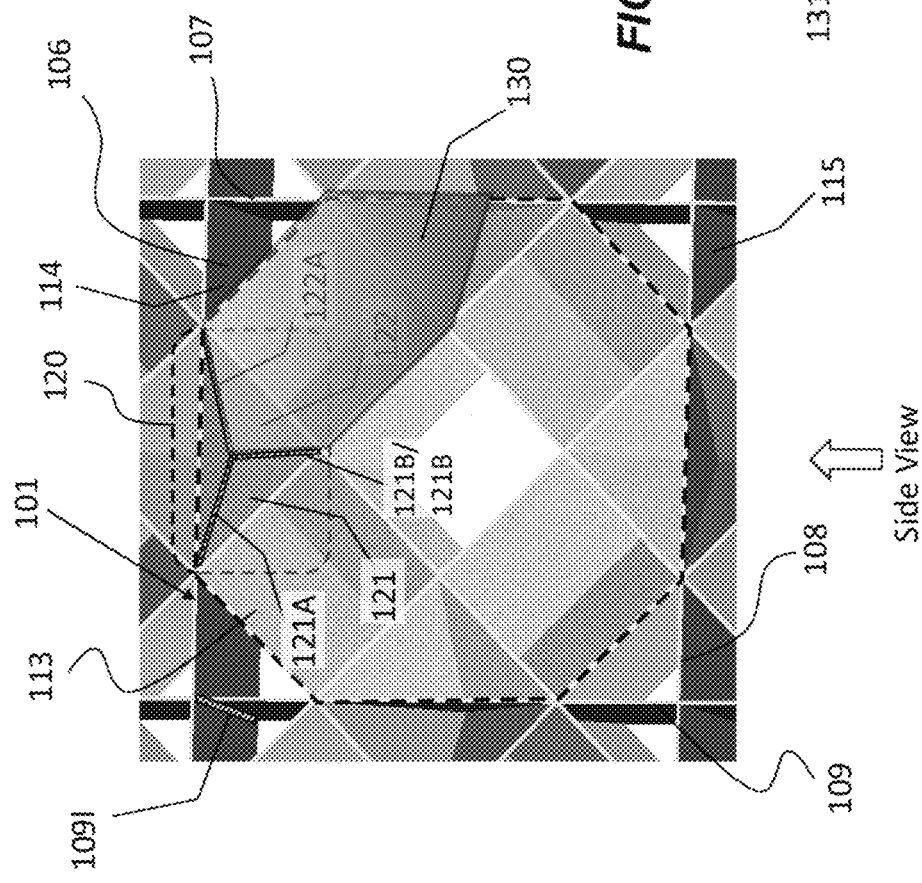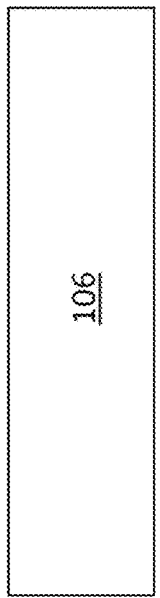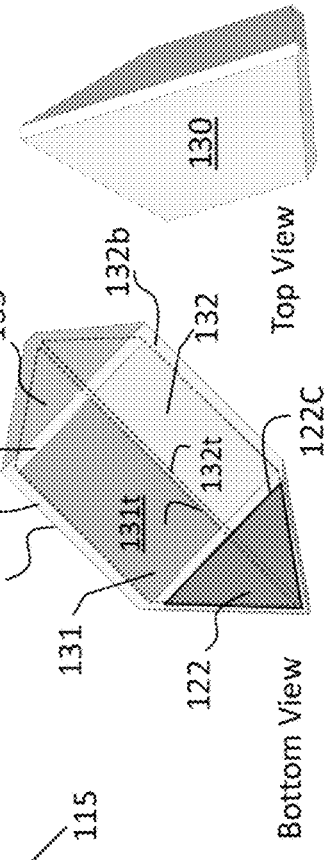

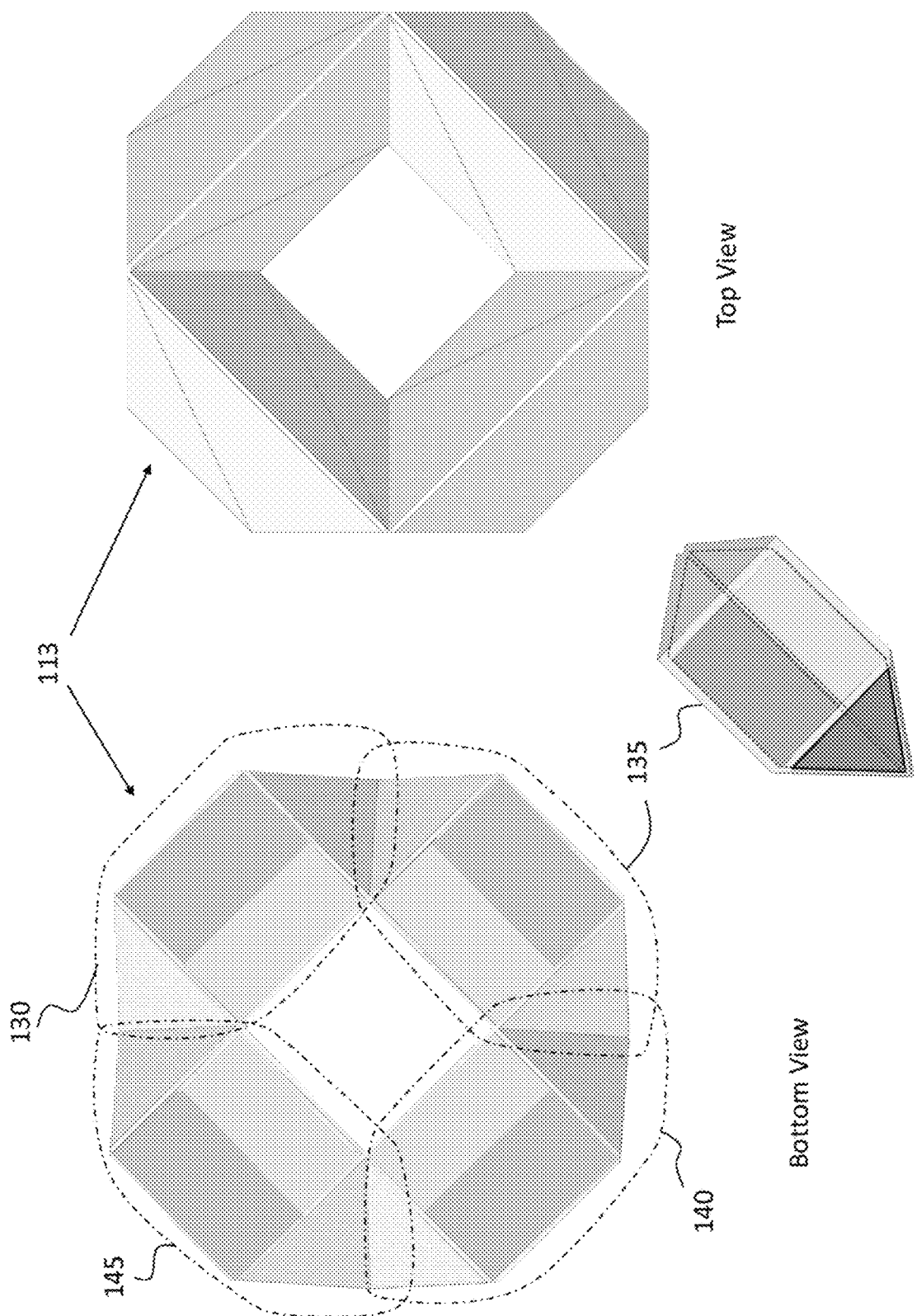

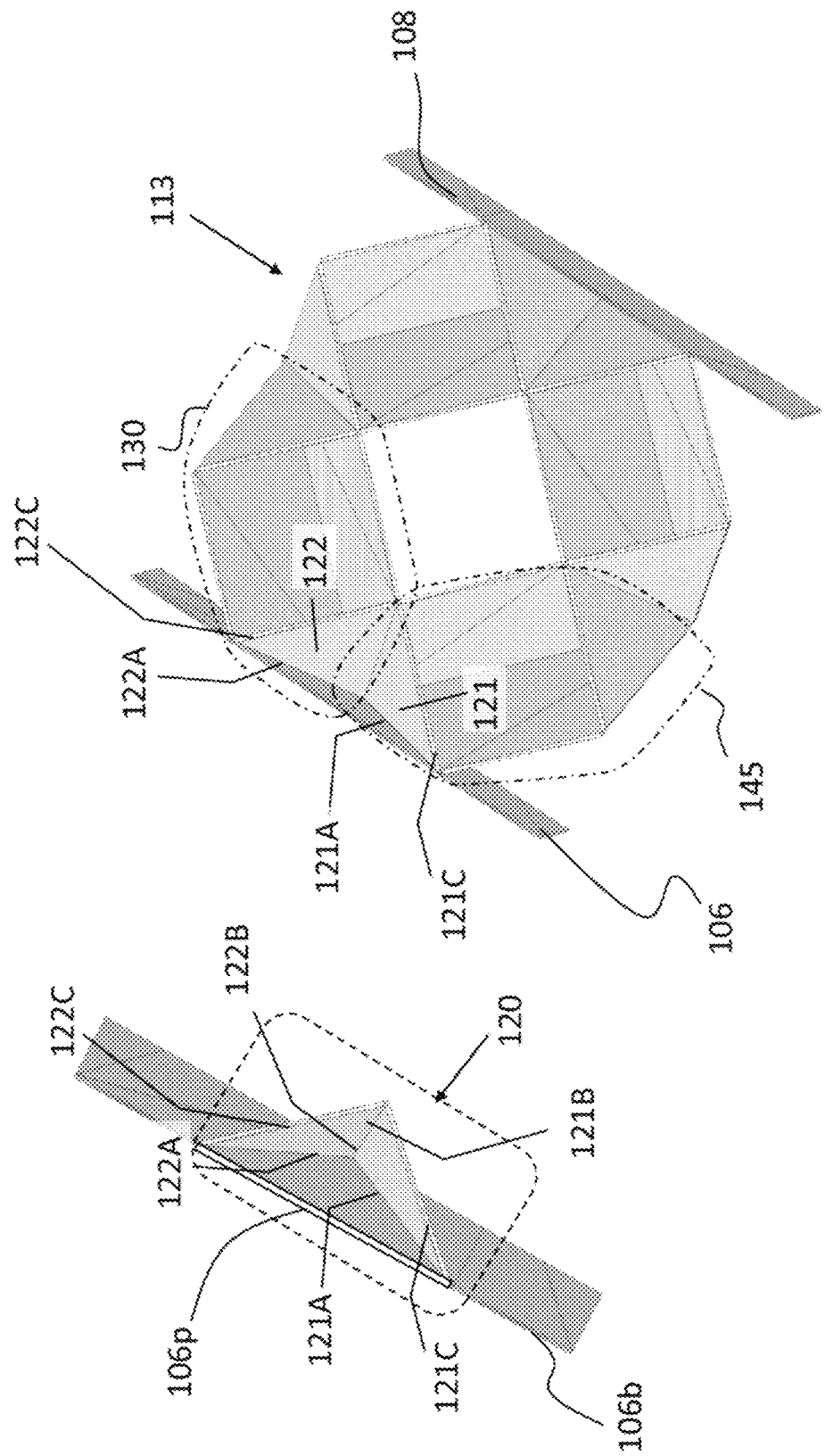

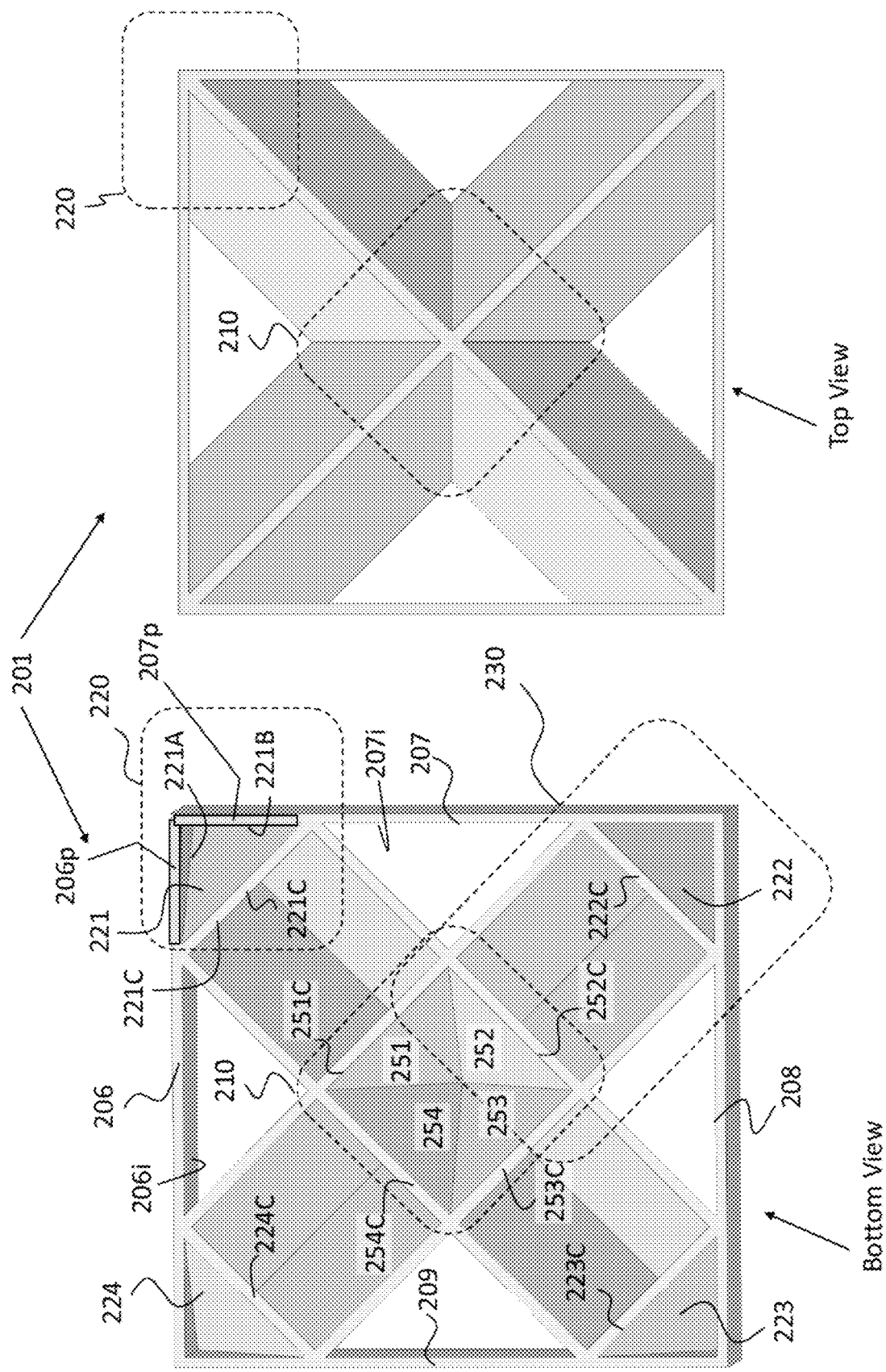

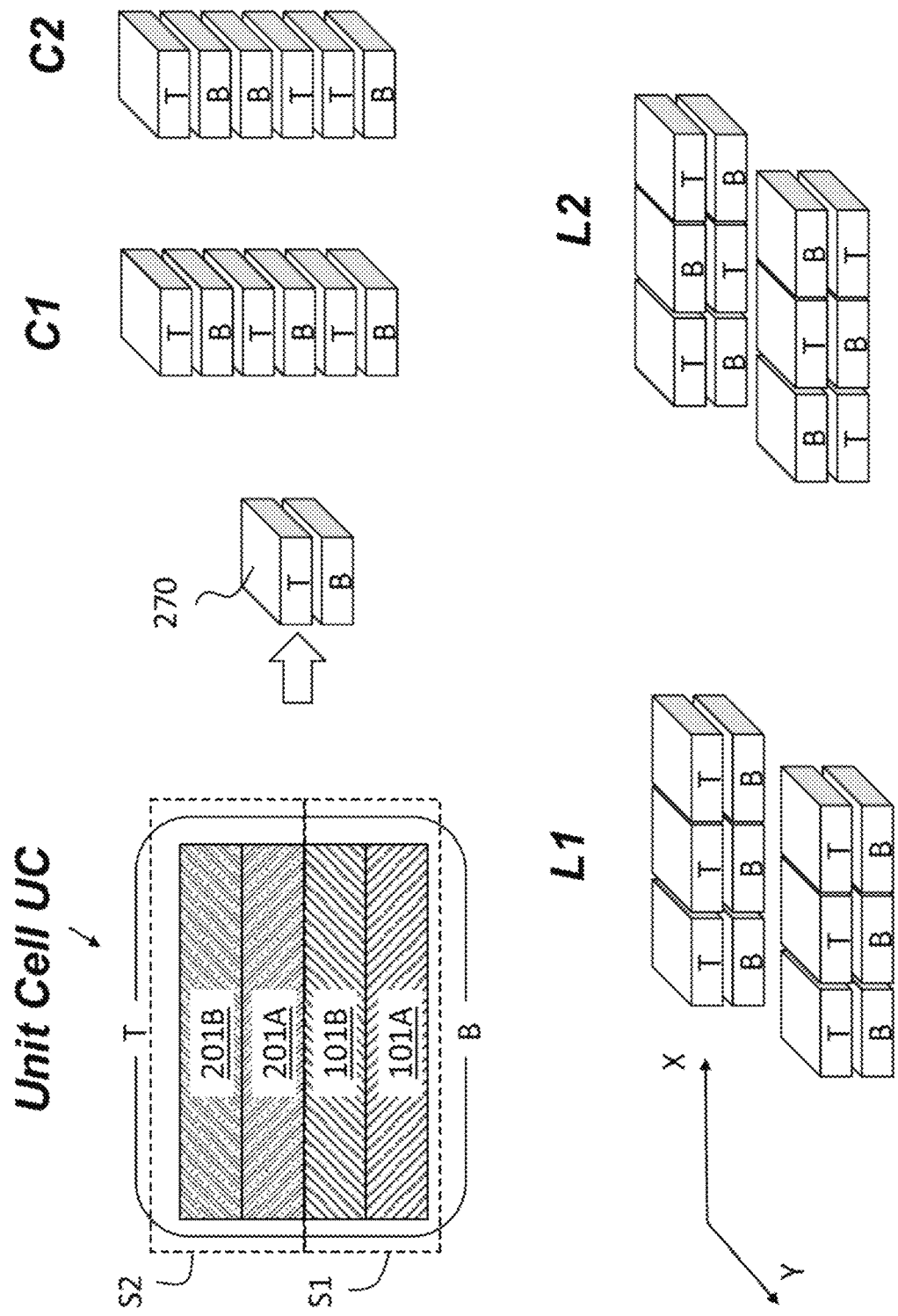

*FIG. 3A*
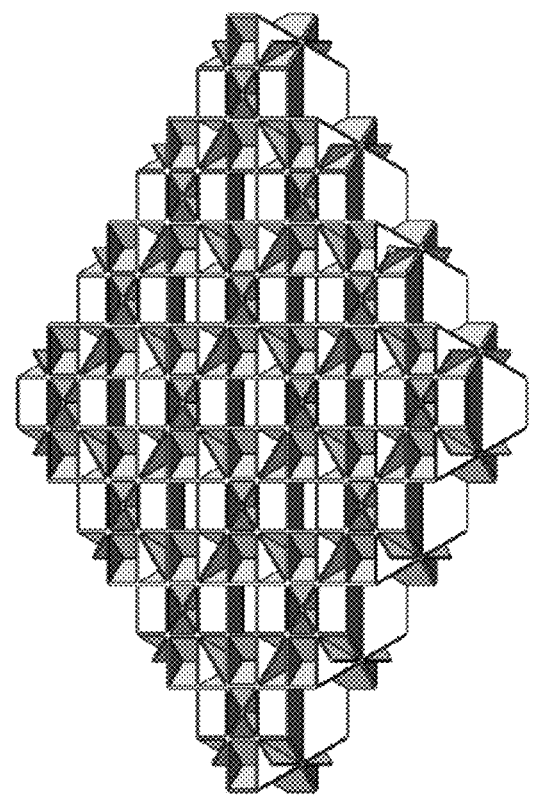
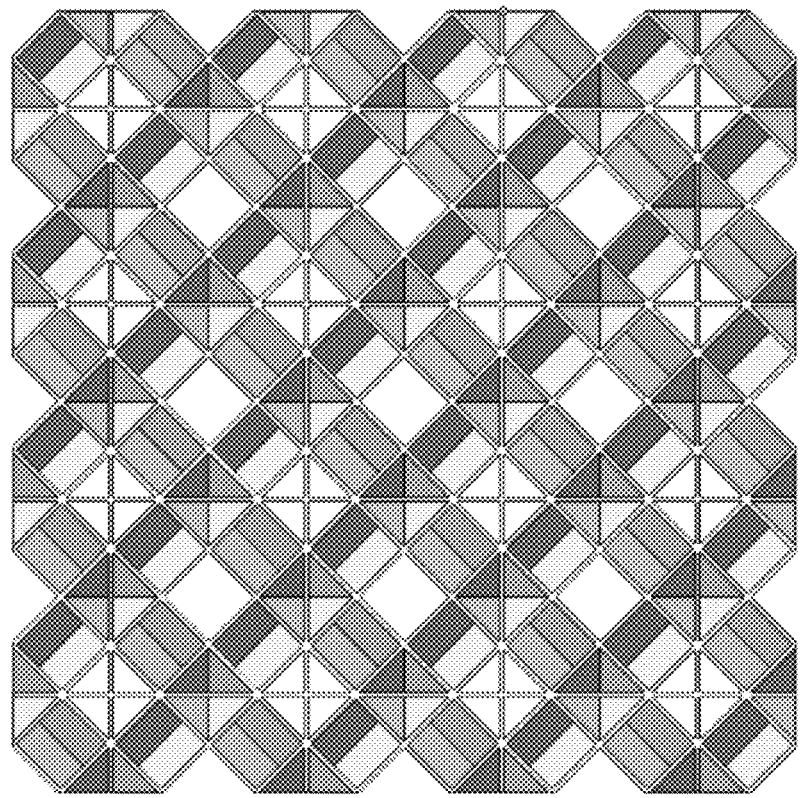
Bottom View

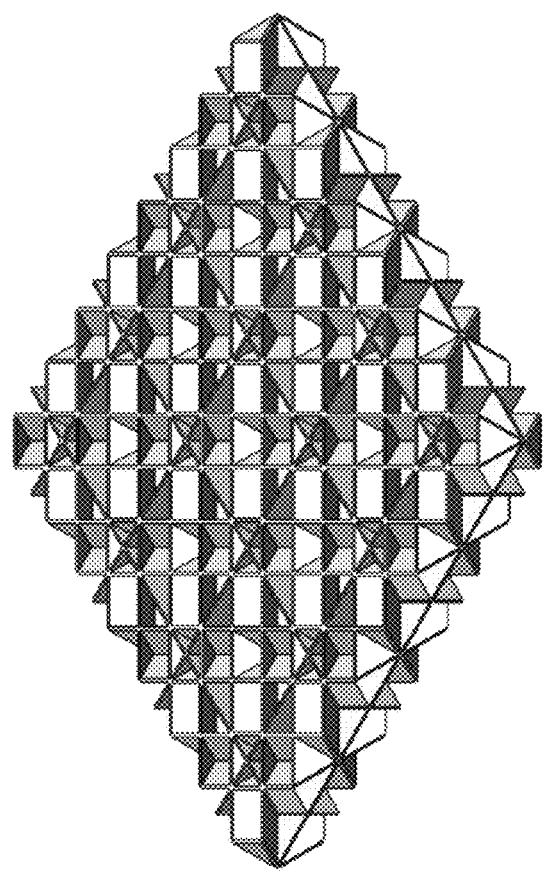
*FIG. 3B*
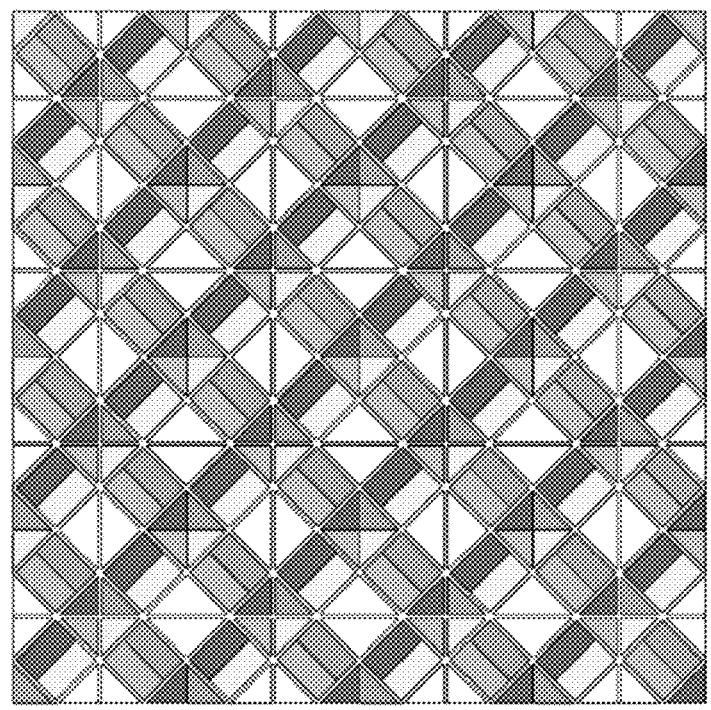

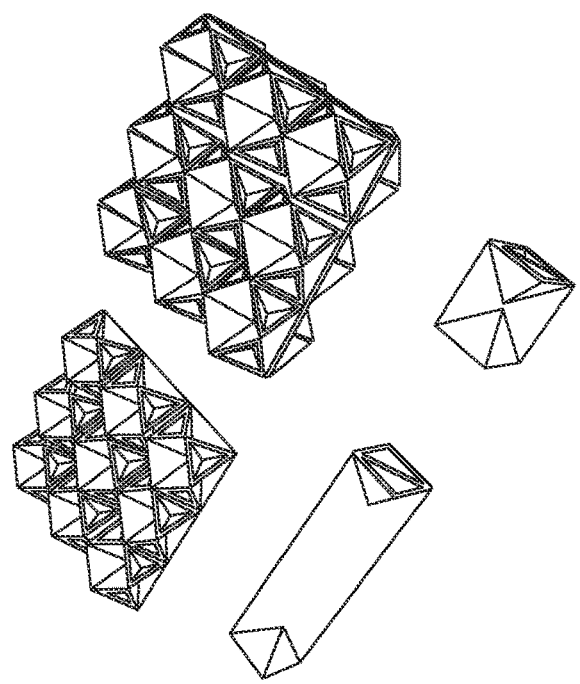
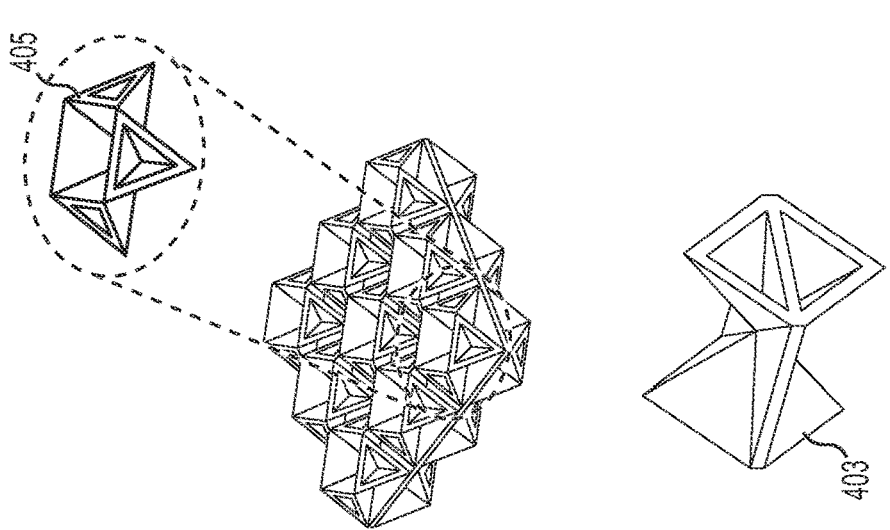
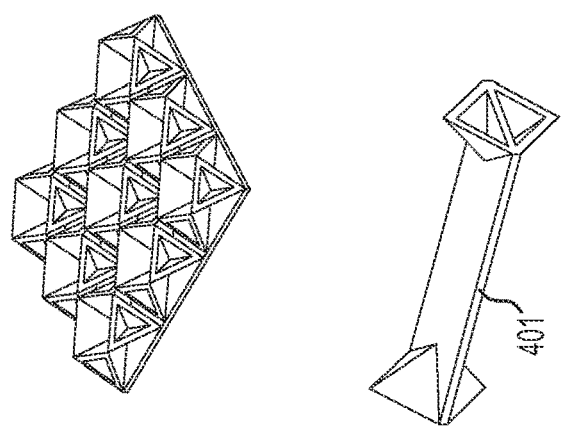
FIG. 4B

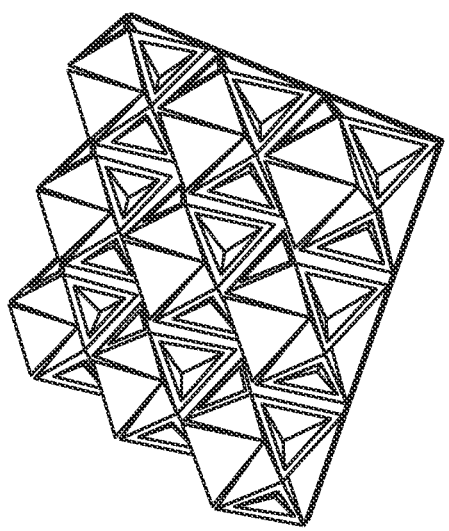
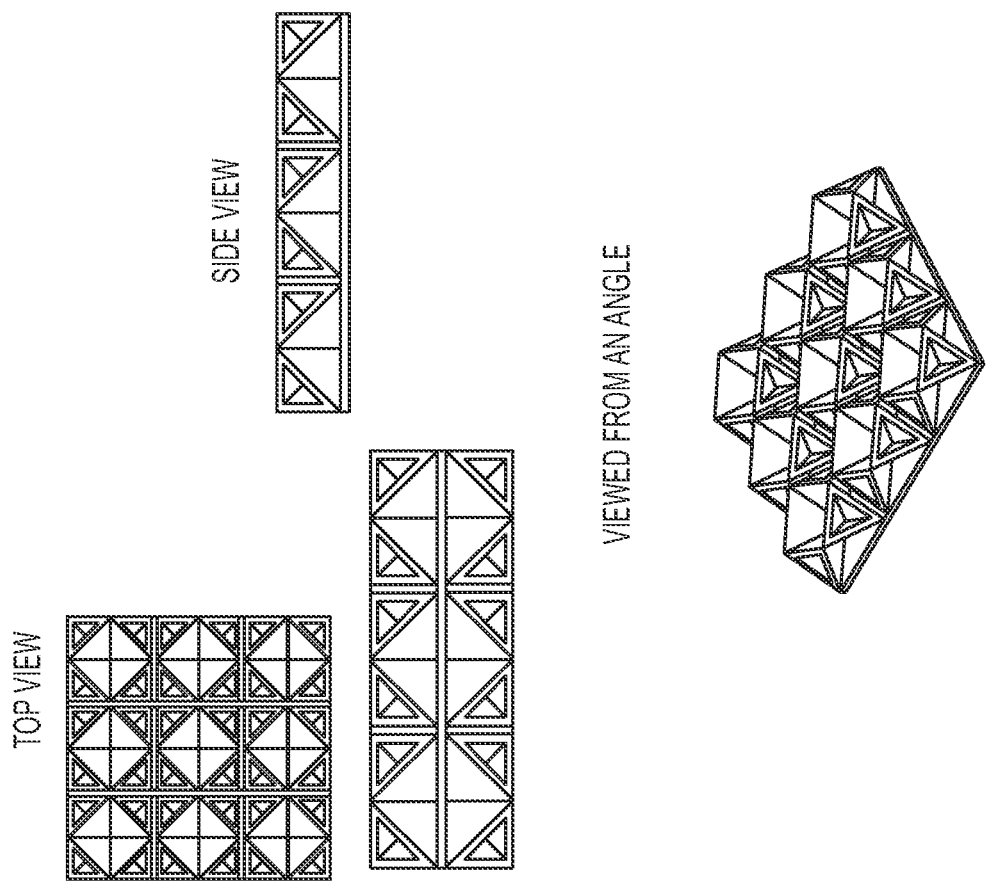
FIG. 4C

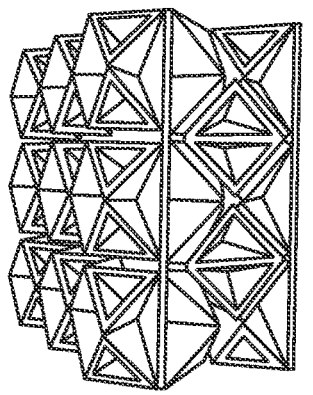
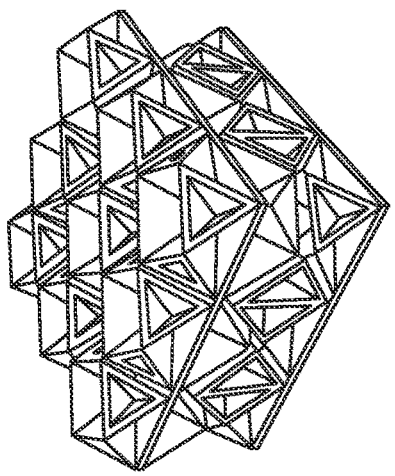
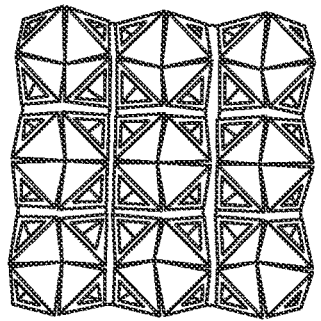
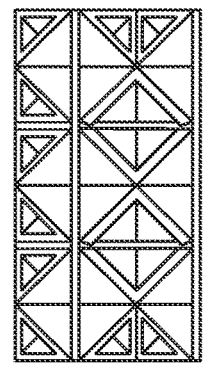
VIEWED FROM AN ANGLE
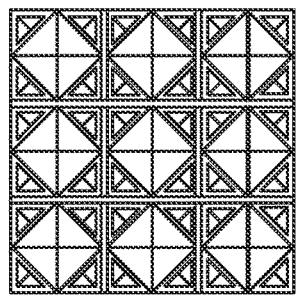
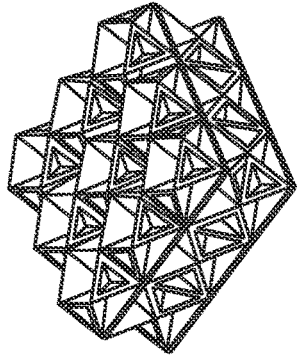
*FIG. 4D*

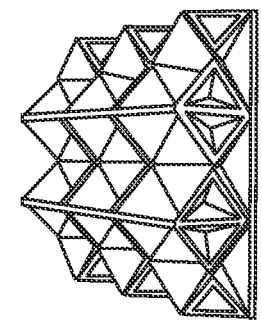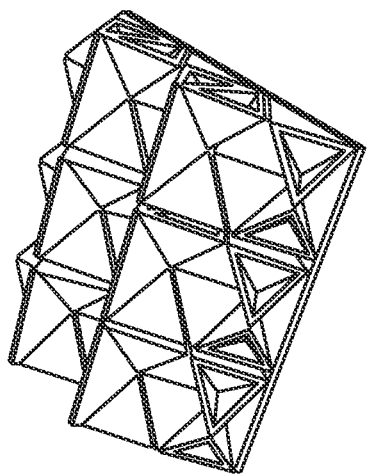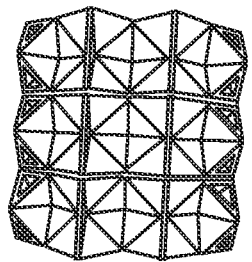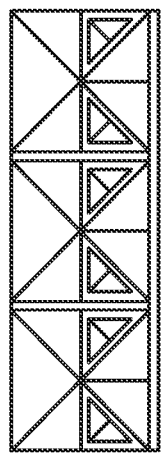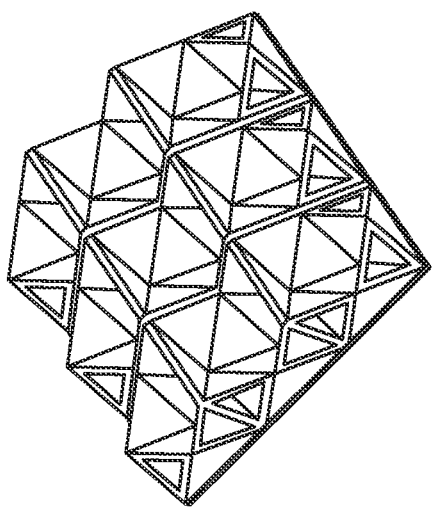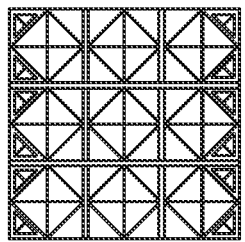
FIG. 4E
VIEWED FROM AN ANGLE

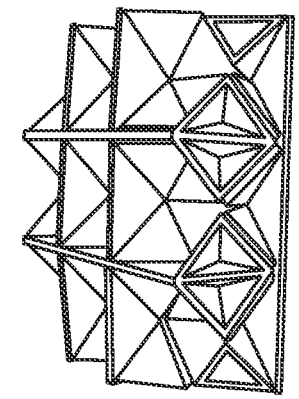
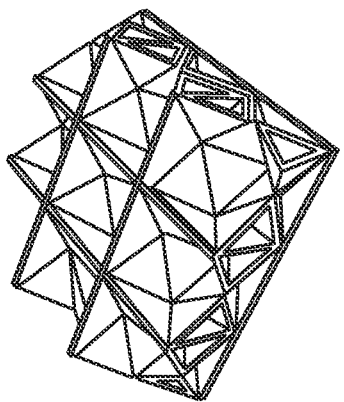
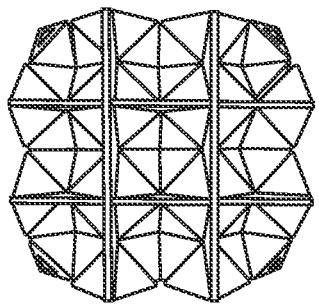
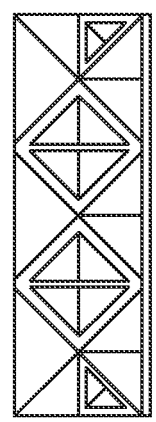
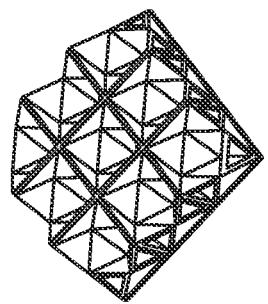
VIEWED FROM AN ANGLE
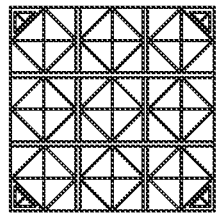
*FIG. 4F*

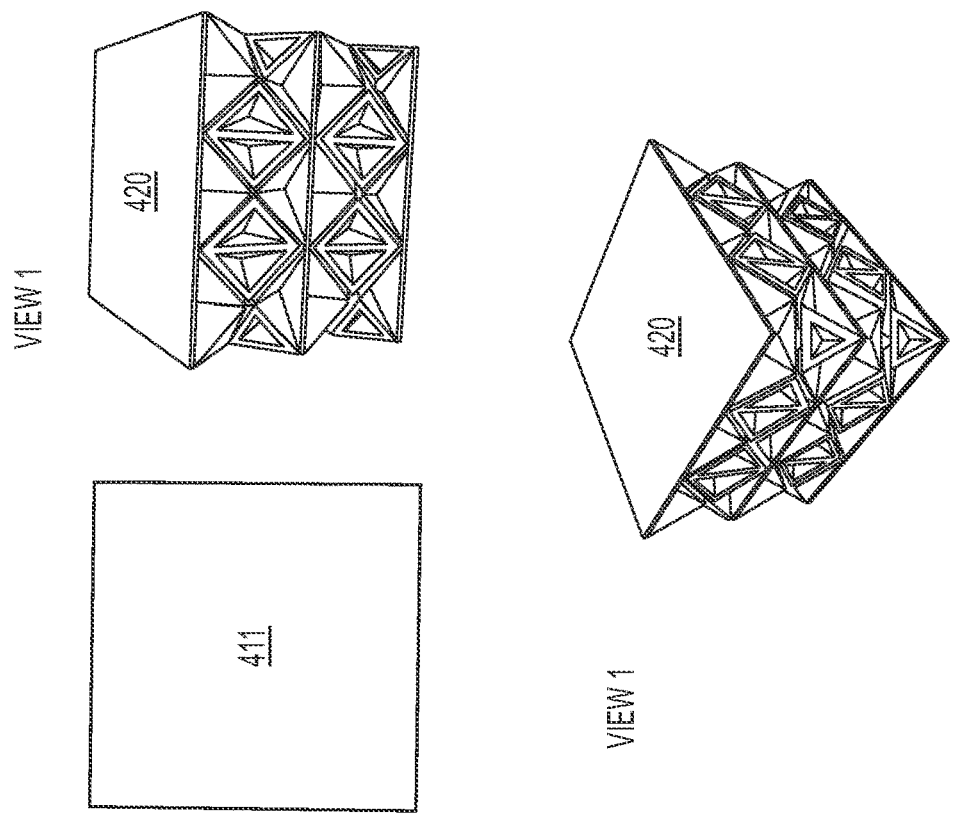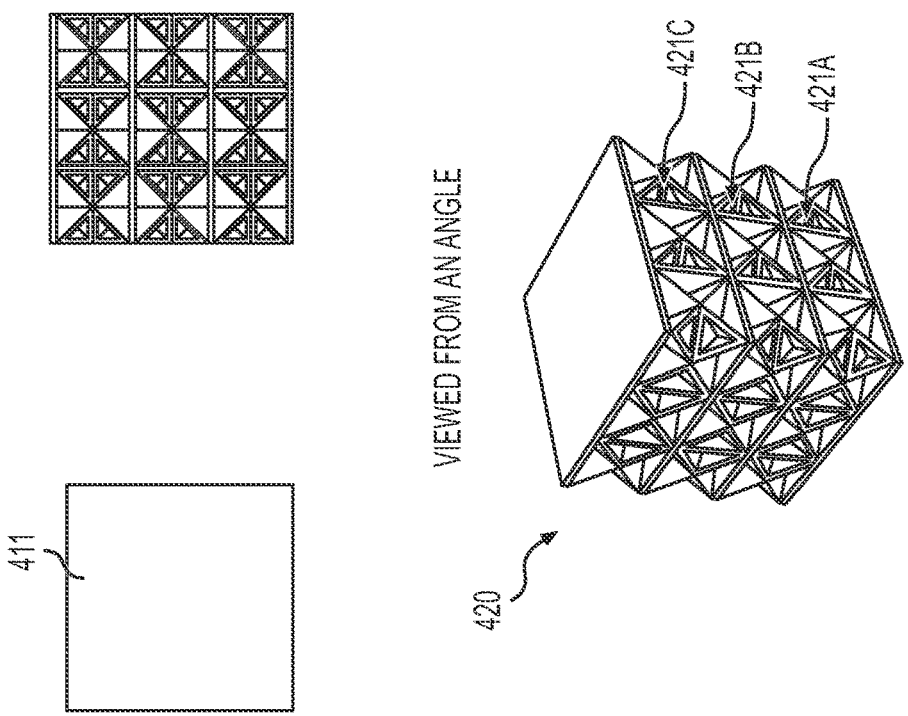
FIG. 4G 3D octet + cubic lattice Isometric view

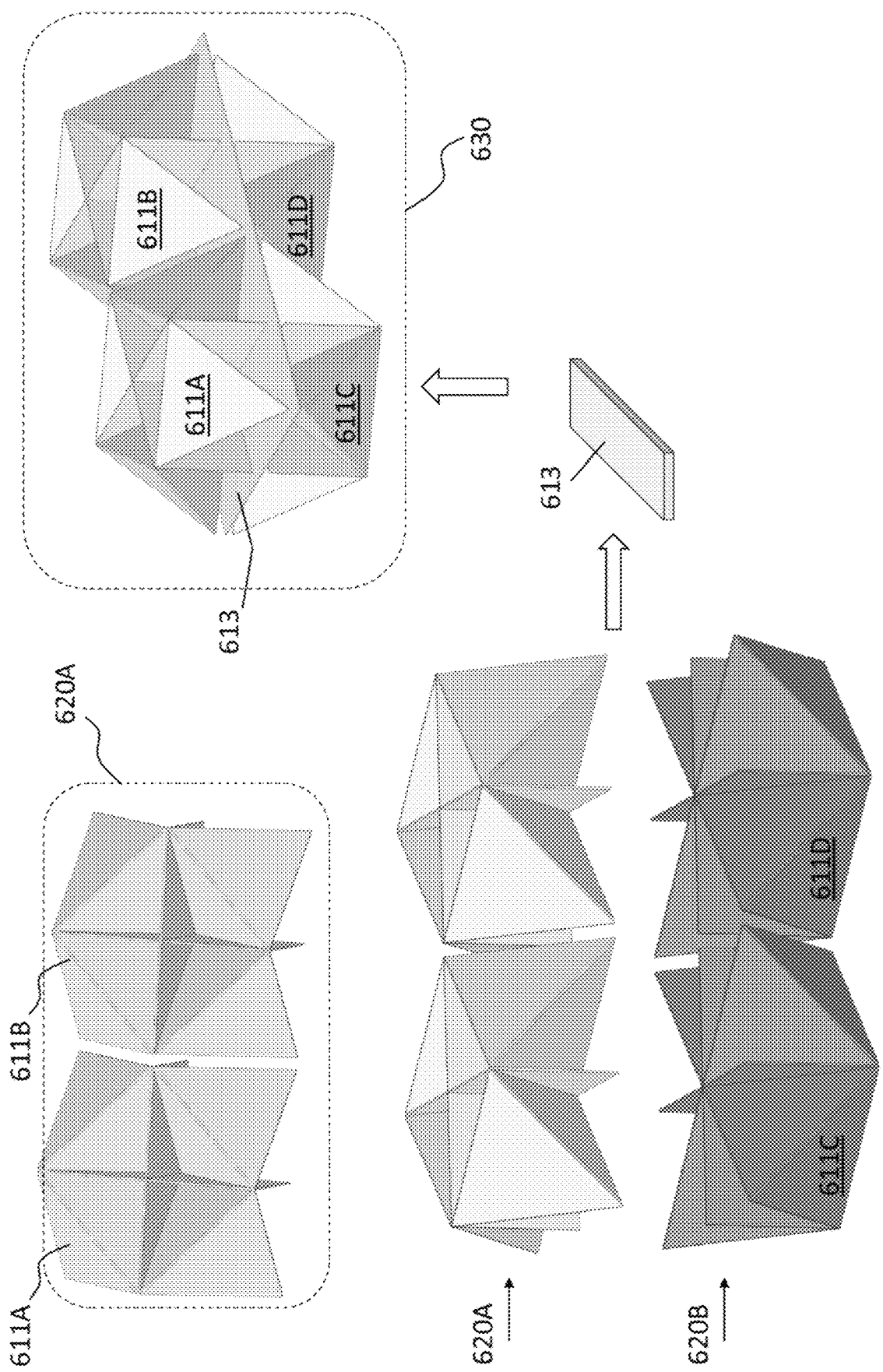

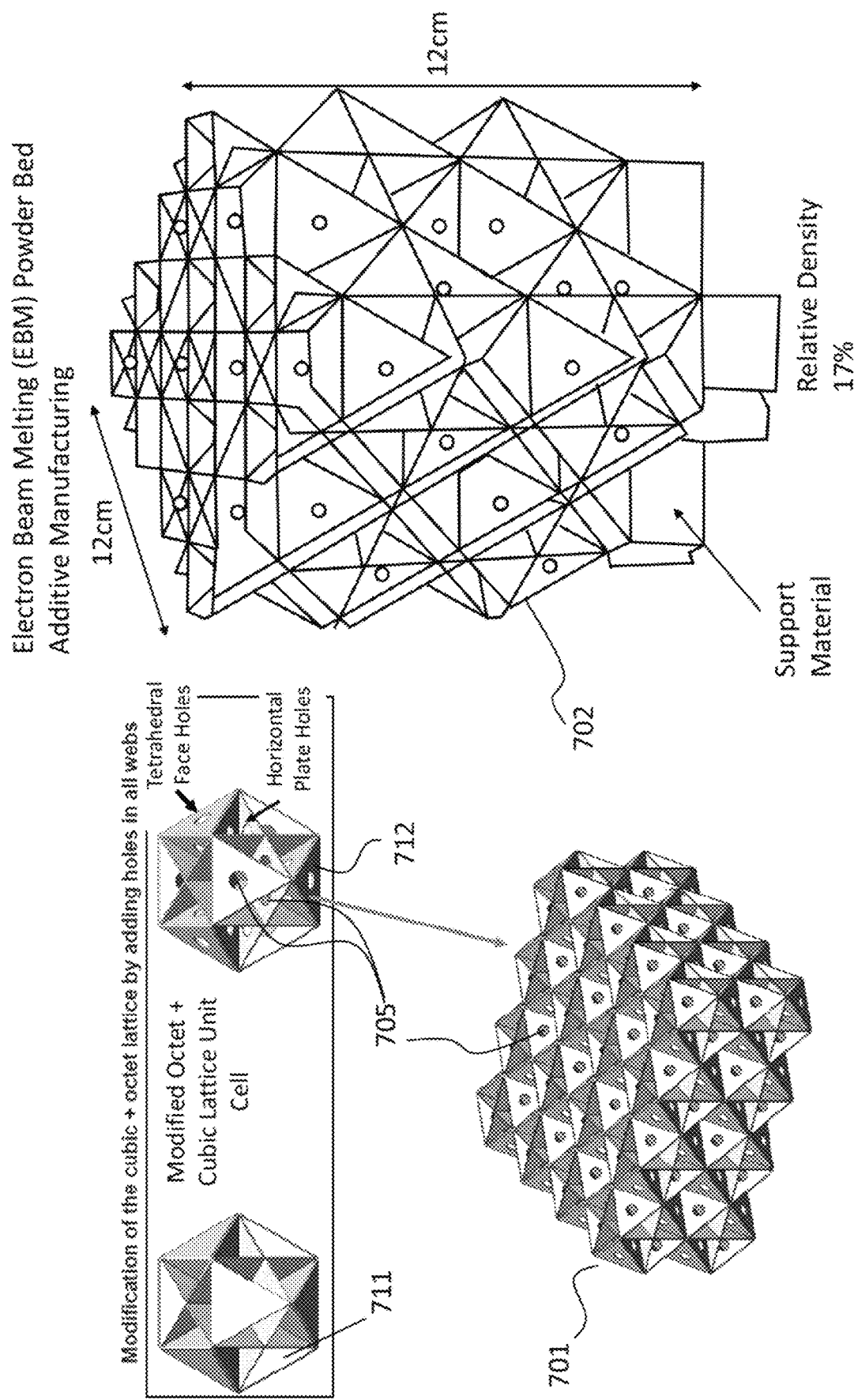

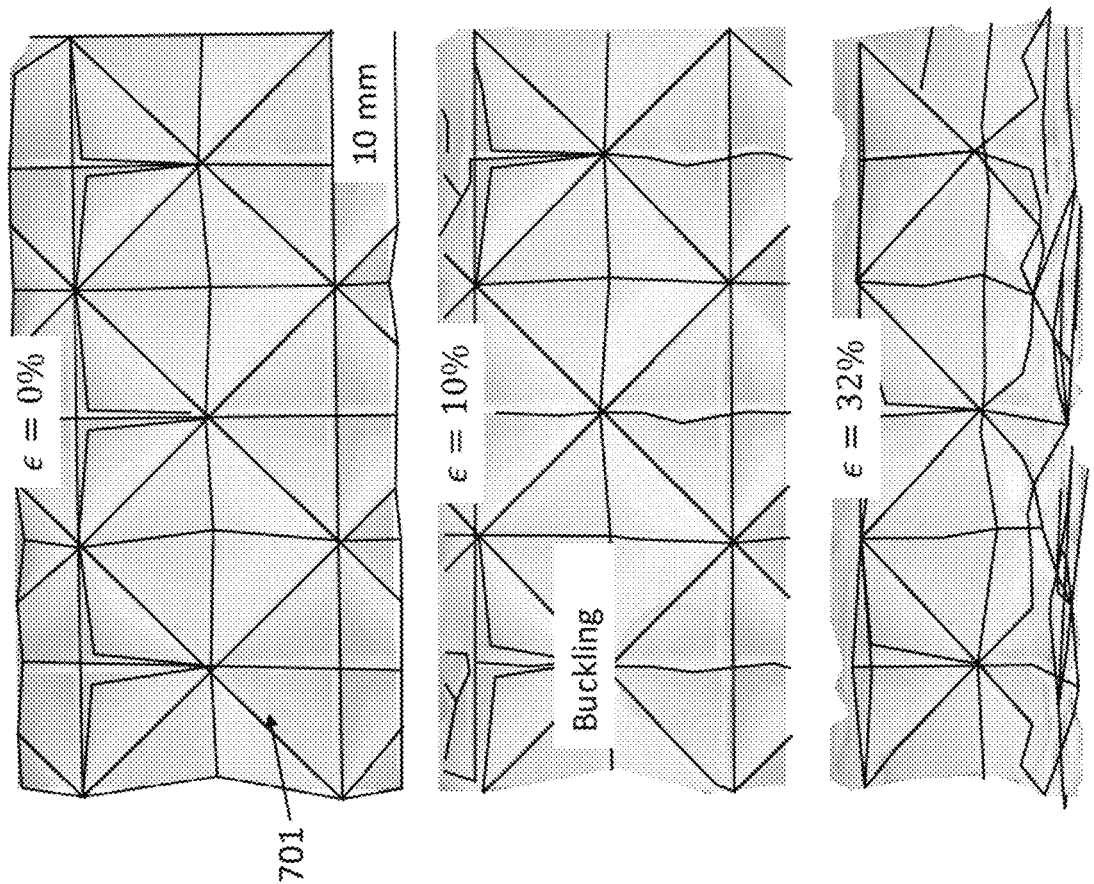
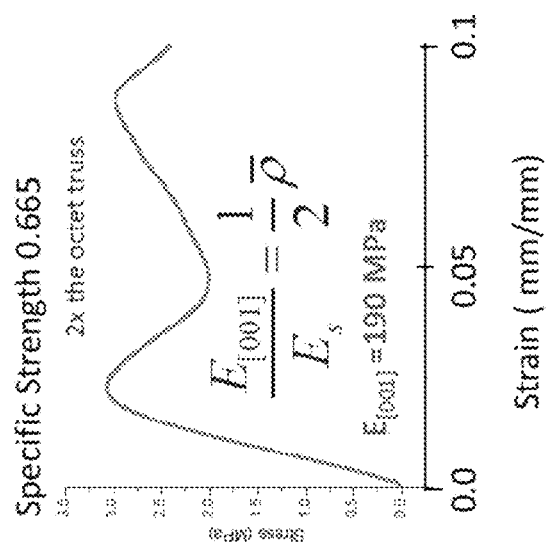
FIG. 8

Simulated cubic + octet lattice strength is ~2 times that of octet truss lattice Von Misses Stresses $P_{a1} .. P_{c3}$ $P_{a1} = 7.2 \cdot 10^7, P_{a2} = 3.6 \cdot 10^7, P_{a3} = 7.5 \cdot 10^6$ $P_{b1} = 1.1 \cdot 10^9, P_{b2} = 5.7 \cdot 10^8, P_{b3} = 1 \cdot 10^8$ $P_{c1} = 1.1 \cdot 10^9, P_{c2} = 9 \cdot 10^8, P_{c3} = 1.3 \cdot 10^8$ Units: $[N/m^2]$

1411 Cutting Shapes → 1411 Folding Shapes → 1411 Joining Shapes

1421 3D Printing Shapes → 1423 Joining Shapes

PLATED LATTICE AND SYSTEMS AND METHODS FOR FORMING THEREOF

CROSS-REFERENCE TO RELATED APPLICATIONS

This application is based on and claims the benefit of priority from U.S. Provisional Application No. 62/940,022, filed Nov. 25, 2019, the content of which is expressly incorporated herein by reference.

TECHNICAL FIELD

The present disclosure relates to lightweight multifunctional lattices. In particular, the present disclosure relates to a structure of a plated lattice as well as systems and methods for forming the plated lattice.

BACKGROUND

Lattice structures are composed of repetitive unit cells with artificially designed geometry to achieve a weight reduction and/or other desirable functionalities. Early development of lattice structures focused on simple structures like a honeycomb structure, a mesh, or a foam structure, primarily due to limitations of conventional manufacturing technologies. However, recently, with improvements in manufacturing, the lattice structures with complicated geometry, hierarchical structures, gradient design, composite materials, and multifunctionality were fabricated, owing to developments and adoption of additive manufacturing (or three-dimensional printing) technology. Fueling research and development of lattice structures is the application of these materials to the aerospace, robotics, biomedical devices, sensing, thermal, optical, electrical, and mechanical devices, as well as other applications. Lattice structures exhibit functionalities beyond conventional load-bearing usage. Some of the desired functionalities are, for instance, tunable rigidity and flexibility, tunable thermal conductivity, tunable electrical properties, tunable shock-absorbing properties, as well as other tunable properties (e.g., tunable optical properties).

The properties of lattice structures are sensitive to both the topology of the unit cell as well as materials used for forming the unit cell. For manufacturers, the main obstacle to obtaining superior properties has involved developing a fabrication process for the lattice structure in a cost-effective way.

Multifunctional materials designers seek to tailor load support properties of interest (e.g., stiffness and strength) in the most efficient way through adjustment of the open cell topology, relative density, and material type. The intervening space can then be used for other functionalities. For example, the porosity within a load-supporting cellular metal structure could also be used to simultaneously enhance impact/blast energy absorption, noise attenuation, catalytic activity, filtration efficiency, electrical energy storage, or act as the host for the in-growth of biological tissue.

While significant advances are made in developing multifunctional lattice structures, there is still a need to develop low-cost multifunctional plate-based lattices that are near the theoretical maximum stiffness and strength for a cellular solid. The present disclosure describes cost-effective ways of making plate-based cellular lattices that may overcome many obstacles of the prior art.

SUMMARY

Consistent with a disclosed embodiment, a lattice structure is provided. The lattice structure may include multiple identical unit cells, each unit cell including a plurality of joined plates, each plate having an orientation characterized by a surface normal. In the lattice structure, some of the plurality of plates may be rectangular plates, some of the plurality of plates may be triangular plates, and some of the plurality of plates may be trapezoidal plates. Further, any two of the joined rectangular plates may have corresponding surface normals perpendicular to each other and at least two edges of each one of the triangular plates may be joined to one of a surface or an edge of one of the plurality of joined plates. Further, at least three edges of each one of the trapezoidal plates may be joined to one of a surface or an edge of one of the plurality of joined plates, and any one of a plurality of surface normals for the triangular plates and the trapezoidal plates may be nonparallel to any one of a plurality of surface normals of rectangular plates.

Consistent with another disclosed embodiment, a lattice structure formed from identical unit cells is provided. A unit cell of the lattice structure may include a first plurality of plates forming a first unit sub-cell, wherein the first unit sub-cell includes a first rectangular prism with side walls having four first vertical rectangular plates of the same size and shape, the first rectangular prism including corners having internal and external surfaces. Further, the unit cell may include four corner triangular plates having the same size and shape, joined to the corners of the first rectangular prism such that each corner triangular plate is joined to each corner, wherein at least a first edge and a second edge of each corner triangular plate are joined with the internal surfaces of each corner forming sides of a triangular pyramid for each corner. Further, the unit cell may include four center triangular plates having the same size and shape joined to form sides of a rectangular pyramid, with a center of the rectangular pyramid located at a center of the rectangular prism, wherein each edge of a base of the rectangular pyramid is parallel to a non-joined edge of the corresponding corner triangular plate. Further, the unit cell may include eight trapezoidal plates having the same size and shape forming four triangular prisms, wherein each two of the eight trapezoidal plates are joined to form sides of a triangular prism, each triangular prism adjacent to the corresponding triangular pyramid, and further adjacent to the rectangular pyramid, wherein non-joined edges of the first unit sub-cell are configured to be located at a top or a bottom side of the first unit sub-cell.

Consistent with another disclosed embodiment, a method of forming a lattice structure having repeated unit cells is provided, wherein each unit cell includes a plurality of shapes and a shape of the plurality of shapes is fabricated from plates and includes one of an incomplete triangular pyramid, an incomplete triangular prism, an incomplete rectangular prism, or an incomplete rectangular pyramid. The method may further include fabricating the plurality of shapes, wherein the fabricating includes at least one of cutting the plates, folding the plates, joining an edge of one of the plates with an edge of another one of the plates, or joining an edge of one of the plates with a surface of another one of the plates. Further the method may include joining the plurality of the fabricated shapes to form a unit cell such that, after the joining, all incomplete shapes are completed, and every completed shape is joined with at least another completed shape.

Consistent with another disclosed embodiment, a method of forming a lattice structure having repeated unit cells is provided, wherein each unit cell includes a plurality of shapes and a shape of the plurality of shapes is fabricated from plates and includes one of an incomplete triangular pyramid, an incomplete triangular prism, an incomplete rectangular prism, or an incomplete rectangular pyramid. The method may further include fabricating the plurality of shapes, wherein the fabricating includes using a three-dimensional printing method for forming the plates and joining an edge of one of the plates with an edge of another one of the plates, or joining an edge of one of the plates with a surface of another one of plates. Further the method may include joining the plurality of the fabricated shapes to form a unit cell such that, after the joining, all incomplete shapes are completed, and every completed shape is joined with at least another completed shape.

Additional objects and advantages of the disclosed embodiments will be set forth in part in the following description, and will be apparent from the description, or may be learned by practice of the embodiments. The objects and advantages of the disclosed embodiments may be realized and attained by the elements and combinations set forth in the claims.

It is to be understood that the foregoing general description and the following detailed description are exemplary and explanatory only and are not restrictive of the invention, as claimed.

BRIEF DESCRIPTION OF THE DRAWINGS

The accompanying drawings are not necessarily to scale or exhaustive. Instead, the emphasis is generally placed upon illustrating the principles of the embodiments described herein. These drawings, which are incorporated in and constitute a part of this specification, illustrate several embodiments consistent with the disclosure, and, together with the detailed description, serve to explain the principles of the disclosure. In the drawings:

FIGS. 1A-1J show examples of elements of a unit sub-cell of a lattice, consistent with disclosed embodiments.

FIGS. 2A-2D show examples of elements of another unit sub-cell of a lattice, consistent with disclosed embodiments.

FIGS. 2E-2F show examples of stacking of unit sub-cells to form a lattice, consistent with disclosed embodiments.

FIGS. 3A-3C show examples of a lattice structure, consistent with disclosed embodiments.

FIGS. 4A-4H show other examples of lattice structures, consistent with disclosed embodiments.

FIG. 6 shows an example process of fabricating a lattice structure based on a three-dimensional octet cubic unit cell, consistent with disclosed embodiments.

FIG. 7 shows an example lattice structure having plates containing cavities, consistent with disclosed embodiments.

FIG. 8 shows examples of lattice deformations due to stress, consistent with disclosed embodiments.

FIGS. 14A-14B show an example process for forming a lattice structure, consistent with disclosed embodiments.

DETAILED DESCRIPTION

Figure 1G:
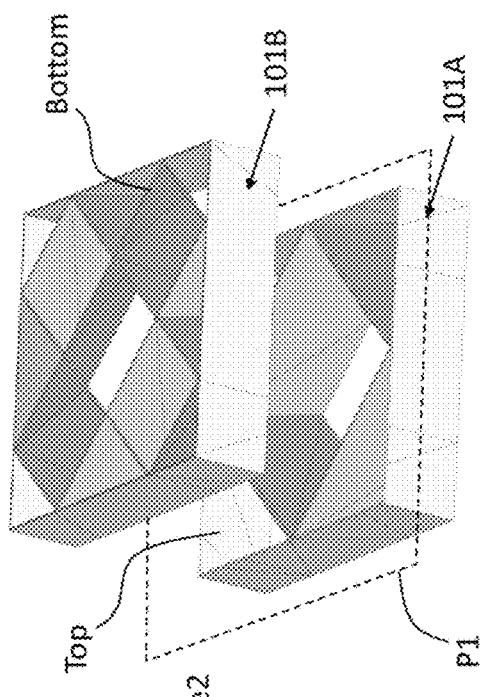

Reference will now be made in detail to exemplary embodiments, discussed with regard to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Consistent with disclosed embodiments, a lattice structure may be formed from identical or substantially identical repeated unit cells. In an example embodiment, the unit cells may be laterally adjacent to each other and/or may be stacked over each other. In an example embodiment, to form a lattice structure, lattice vectors defining discrete three-dimensional translations of a unit cell may be used. Thus, the lattice structure may be defined by a type of unit cell used (e.g., the type of unit cell may be characterized by a topology of the unit cell, the material of the unit cell, etc.), and by relative arrangements of the unit cells. In some cases, a unit cell may be most easily described by describing parts of the unit cell, herein referred to as unit sub-cells, as well as a relative arrangement of these unit sub-cells, as well as joint points, edges, or surfaces of these unit sub-cells.

In various embodiments of the present disclosure, lattice structures are made from plates forming plated elements or plated structures. Plated elements may include three-dimensional elements that are assembled from plates (e.g., a plated element may be a folded sheet of metal containing joined planar regions). In some cases, lattice structures may be further made from shells (i.e., plates that include curvature).

In an example embodiment, plates may have any suitable shape, thickness, elastic properties, rigid properties, and the like. The plates (or plated elements) of a lattice structure may be made from metal, ceramics, glass, polymer, or any other suitable material that can be used for top-down fabrication (or bottom-up fabrication) of the plates. In some cases, the plates may be fabricated by cutting them from a sheet of material using any suitable means (e.g., using a laser, via shape stamping, etc.). In some cases, the plated elements may be fabricated by folding cut-out shapes (e.g., shapes cut out from a sheet of material). The plated elements may be joined by any suitable means (e.g., welding, gluing, connecting via connecting elements (e.g., bolts, screws, etc.), or any other suitable joining means). In some embodiments, the plated elements may be fabricated and joined using additive manufacturing or bottom-up self-assembly. In some cases, the plated elements may be fabricated via photo-lithography, ion-beam milling, ion-beam sputtering, evaporation, or via any other suitable fabrication technique.

In various embodiments, plated elements may include vertices, edges, and surfaces. In some cases, plated elements may form closed elements (i.e., elements that have completely joined internal surfaces and completely joined external surfaces). Such plated elements may not contain non-joined edges and will be referred to as closed or completed.

For example, a prism or a pyramid that has not free or unconnected edges and contains all of its surfaces may be referred to as completed or closed. Additionally, the plated element may not be closed. For example, a prism or a pyramid that is missing at least one of its surfaces is referred to as an incomplete or not closed (alternatively referred to as open) prism. The incomplete plated elements include at least some edges that are not joined with any other edges or surfaces. In an example embodiment, internal surfaces of the incomplete element are adjacent to external surfaces of such an element, with a boundary being an edge.

Consistent with disclosed embodiments, unit cells of a lattice structure may include a plurality of joined plates. An example plate may have any suitable surface orientation within a lattice structure, which may be conveniently characterized by a surface normal. Consistent with one example embodiment, the lattice structure may include rectangular plates, triangular plates of various shapes and sizes, and trapezoidal plates. For example, FIG. 1A shows an example unit sub-cell 101. Unit sub-cell 101 may include plates of various shapes and sizes. For example, unit sub-cell 101 may include rectangular plates 106-109, which may be joined with each other at edges, such as edge 109I, as shown in FIG. 1A. In an example embodiment, rectangular plates 106-109 may be joined such that any two of the joined rectangular plates may have corresponding surface normals perpendicular to each other (i.e., the rectangular plates may be joined such that one is perpendicular to another). In an example embodiment, the rectangular plates may have the same size and shape and may form a rectangular prism having internal surfaces, such as, for example, surface 114, and external surfaces, such as surface 115. An example side view of rectangular plate 106 is also shown in FIG. 1B. As shown in FIG. 1A, surfaces 106-109 are joined at edges (e.g., edge 109L) to form corners of a rectangular prism. While the rectangular prism with a rectangular base is shown in FIG. 1A, in some embodiments, surfaces 106-109 may be joined to form a prism with a parallelepiped base, a diamond base, or base of another suitable shape.

As shown in FIGS. 1A and 1n further figures, numerical values are used for labeling plates and three-dimensional shapes, while alphanumerical values are used for labeling edges and surfaces of the plates. If a plate includes four edges, the edges may be labeled with letters l, r, t, and b to refer to left, right, top, and bottom edges. For triangular plates, letters A, B, C are used, and for surfaces, any suitable alphanumerical labels are used. It should be noted that terms of orientation, such as, for example, "top," "bottom," etc. are only used for reference and ease of description. That is, for example, in some cases, an edge referred to as a top edge may in reality be a bottom edge and vice versa.

Unit sub-cell 101 may further include a plurality of triangular plates. In an example embodiment, as shown in FIG. 1A, triangular plates 121 and 122 are joined at respective edges 121A and 122A with an internal side 114 of a rectangular plate 106. Further, edge 121B of plate 121 may be joined with edge 122B of plate 122 to form a triangular pyramid 120. A side view of triangular pyramid 120 is also shown in FIG. 1C. Pyramid 120 includes plates 121 and 122, with respective edges 121A-121B and 122A-122B. Further, plates 121 and 122 have respective top edges 121C and 122C, which, as shown in FIG. 1C, are not joined with any other surfaces or edges.

Additionally, unit sub-cell 101 may further include a plurality of trapezoidal plates, such as plates 131 and 132, as shown in FIG. 1D, bottom view. Trapezoidal plates may form a triangular prism 130 with plates 131 and 132 joined at respective top edges 131t and 132t. Triangular prism, as shown in FIG. 1D, may include triangular plates 133 and 122, joined at edges with trapezoidal plates 131 and 132. In an example embodiment, triangular prism 130 may be joined to rectangular prism at rectangular plate 106 and rectangular plate 107. As shown in FIG. 1A, triangular prism 130 is joined with plate 106 at edge 122A. At edge 122B, prism 130 may be joined with triangular plate 121 formed by rectangular plates 106-109, as shown in FIG. 1A. In an example embodiment, edges 122C, 131b, 132b, and 133C are not joined to any surfaces or edges as shown in FIG. 1D. Thus, triangular prism 130 is said to be incomplete, as previously described. FIG. 1D, top view, also shows triangular prism 130 as seen from the top side (herein triangular prism 130 is also referred to as roof element 130 due to its resemblance to a roof).

FIG. 1A shows that four roof elements, such as element 130, are joined together to form an element 113. Element 113 may be joined with a rectangular prism formed by plates 106-109 to form unit sub-cell 101 (herein also referred to as a first unit sub-cell). FIG. 1E, bottom view, shows four roof elements 130, 135, 140, and 145 (which will be referenced hereinafter as 130-145) connected (terms "connected" and "joined" are used interchangeably in this disclosure) at respective edges to form element 113. Also, for completeness, a top view is shown in FIG. 1E. FIG. 1F shows element 113 joined with plates 106 and 108. In an example embodiment, roof elements 145 and 130 are joined with plate 106 via respective edges 121A and 122A. Edges 121B and 122B are also joined to form a triangular pyramid 120. As shown in FIG. 1F, edges 121C, 122C, and a portion 106p of a bottom edge 106b is used to form triangular pyramid 120. FIG. 1F also shows that at least two edges of each one of triangular plates 121 and 122 are joined to one of a surface or an edge of one of the plurality of joined plates. For trapezoidal plates 131 and 132, as shown in FIG. 1D, at least three edges of each one of trapezoidal plates 131 and 132 are joined to one of a surface or an edge of one of the plurality of joined plates (e.g., plates 122, 133, as well as edges of plates 131 and 132). As seen from FIG. 1A, all of the surface normals for various triangular plates and trapezoidal plates are nonparallel to any one of a plurality of surface normals of rectangular plates. Such an arrangement of plates results in target mechanical properties for a lattice structure formed from such plates, such as target stiffness, elasticity, and other properties (e.g., coefficient of thermal expansion). As shown in FIG. 1A, eight side triangular plates (such as plates 121 and 122) may have the same size and shape and may be joined to a center portion of vertical rectangular plates 106-109, forming four triangular pyramids (e.g., triangular pyramid 120). Each one of the four triangular pyramids may be adjacent to each plate, and each of the triangular pyramids may include two of the eight side triangular plates joined to each other and joined each one of the internal surfaces of vertical rectangular plates 106-109. In an example embodiment, eight trapezoidal plates (e.g., plates 131 and 132) may have the same size and shape and may form four triangular prisms 130-145. Each two of the eight trapezoidal plates may be joined to form sides of a triangular prism (e.g., prism 130), and each triangular prism may be adjacent to a corresponding triangular pyramid for each plate (e.g., prism 130 is adjacent to pyramid 120, with plate 122 belonging to both prism 130 and pyramid 120).

Figure 1H:
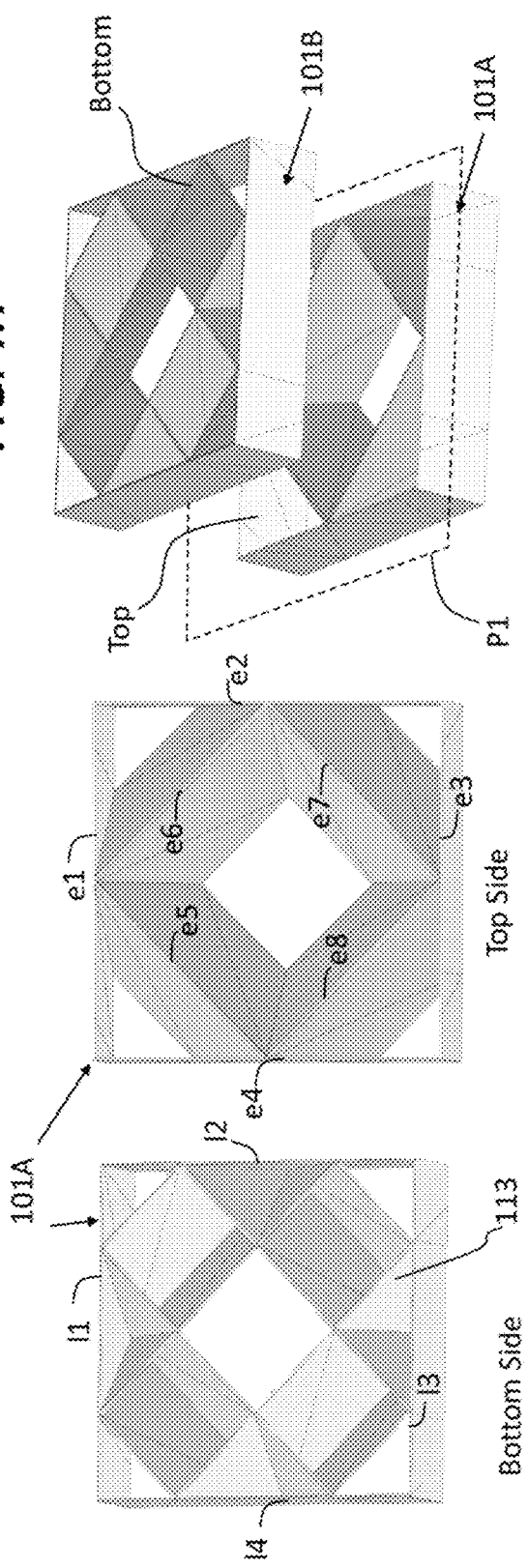

FIGS. 1G-1J show that unit sub-cell 101 may be stacked to form more complicated sub-cell structures. For example, unit sub-cell 101B (which is an identical copy of unit sub-cell 101) may be placed over unit sub-cell 101A (also an identical copy of unit sub-cell 101), as shown in FIG. 1H. The particular stacking may depend on which side of unit sub-cell 101A (top or bottom side, as shown in FIG. 1G) faces the top side of unit sub-cell 101B. For example, as shown in FIG. 1H, top side of sub-cell 101A is joined together with the top side of sub-cell 101B resulting in a sub-cell structure having a symmetry plane P1 (as shown in FIG. 1H). In various embodiments, all the non-joined edges e1-e4 of the top side of 101A may be joined with corresponding non-joined edges of the top side of 101B. Additionally, joined edges e5-e8 may be further joined with corresponding joined edges of the top side of 101B. Since edges e1-e8 are located at the top side of 101A and are in the same plane, such edges are referred to as top side edges or edges at the top side. Similarly, edges located at the bottom side of 101A (e.g., edges 11-14) are in the same plate and are referred to as bottom side edges or edges at the bottom side.

Figure 1J:
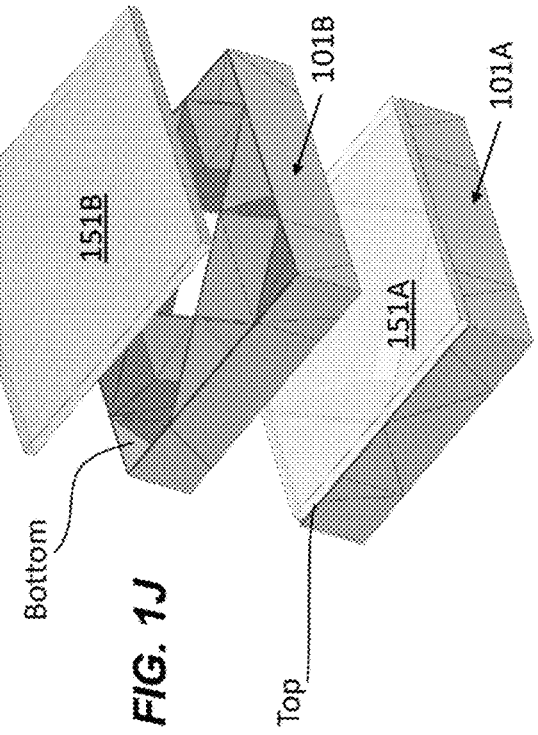
Figure 1I:
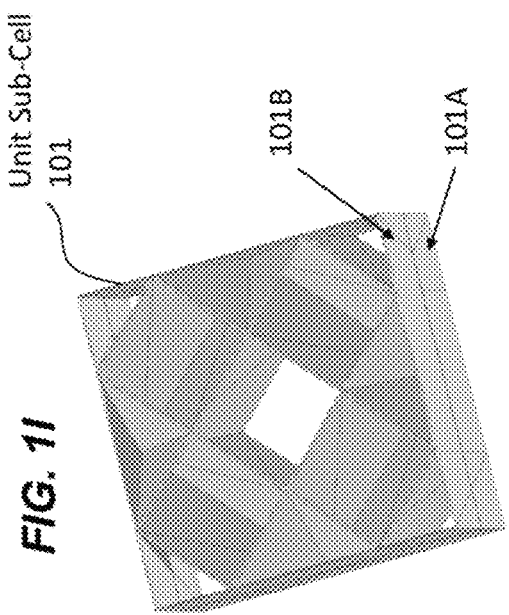

FIG. 1I shows unit sub-cell 101 formed by joining sub-cells 101A and 101B. It should be noted that a particular stacking shown in FIG. 1H is only illustrative, and other stackings may be used. For example, a bottom side of 101B may be joined with the top side of 101A (note that in such cases, some of the edges of the bottom side of 101B may remain to be non-joined with other edges or surfaces). Alternatively, the bottom side of 101A may be joined with the bottom side of 101A, resulting in all the previously non-joined edges of the bottom side of 101A joined with corresponding previously non-joined edges of the bottom side of 101B.

In an example embodiment, as shown in FIG. 1J, a horizontal plate 151A may be sandwiched between sub-cells 101A and 101B. In an example embodiment, all top (bottom) non-joined edges (as well as some of the joined edges, such as edges e5-e8) of sub-cell 101A may be joined with plate 151A, and all top (bottom) non-joined edges of sub-cell 101B ((as well as some of joined edges) may also be joined with plate 151A. In an example embodiment, unit sub-cell 101 may further include horizontal plate 151B placed over 101B and joined with every bottom (top) non-joined edges (and/or some of joined edges) of sub-cell 101B. As shown in FIG. 1G, non-joined edges may be either at the bottom side of 101A or at the top side of 101B. In an example embodiment, all other edges may be joined with either surfaces or other edges of plates forming structures 101A or 101B.

Figure 2B:
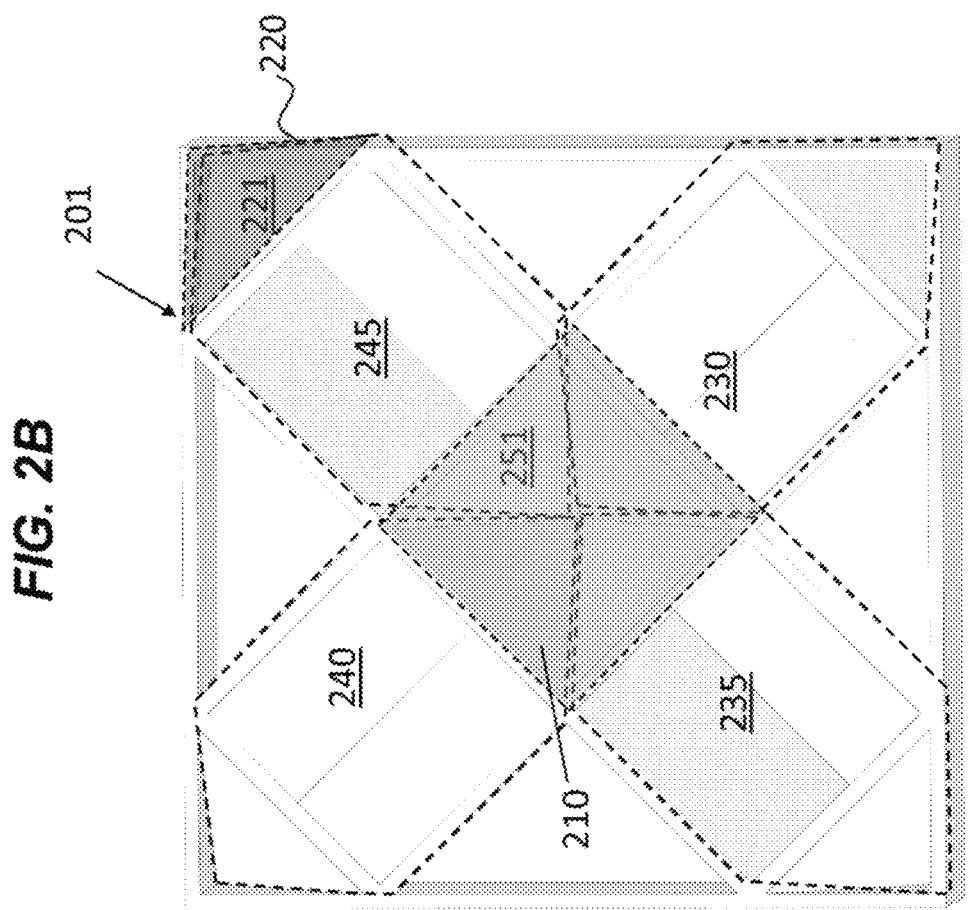

Unit sub-cell 101, as shown in FIG. 1A, is one example of a unit sub-cell. Another exemplary unit sub-cell—a unit sub-cell 201 is shown in FIG. 2A (such unit sub-cell is also referred to as a second unit sub-cell). Similar to sub-cell 101, unit sub-cell 201 includes rectangular planes 206-209. In an example embodiment, planes 206-209 may be of the same size and shape and may be the same size and shape as planes 106-109 of FIG. 1A. Furthermore, planes 206-209 may form a rectangular prism being identical in size and shape as rectangular prism formed by planes 106-109. Unit sub-cell 201 may include triangular prisms (i.e., roof elements) such as element 230, as shown in FIG. 2A. Four of such elements 230, 235, 240, and 245 (which will be referenced hereinafter as 230-245, and which may be the same as corresponding elements 130-145 of structure 113, as shown in 1E), as shown in FIG. 2B. FIG. 2A shows both a bottom and a top view of unit sub-cell 201. As shown in FIG. 2A, bottom view, roof elements (e.g., 230-245, as shown in FIG. 2B) form a rectangular pyramid 210 in the middle of sub-cell 201. Further roof elements 230-245 form triangular pyramids (e.g., pyramid 220) at corners formed by joining plates 206-209. For example, four triangular plates 221-224 (herein also referred to as corner triangular plates) may be joined to the corners of rectangular prism formed by plates 206-209. In an example embodiment, plates 221-224 may be of the same size and shape. As shown in FIG. 2A, plates 221-224 may be joined such that two edges of each plate (e.g., edges 221A and 221B of plate 221) are joined with internal surfaces (e.g., corresponding surfaces 206i and 207i) of plates 206-209. Note that triangular pyramid 220 may include edges 221C, 206p, and 207p that may not be joined with any other edges or surfaces (these edges are referred to as bottom side edges or edges at the bottom side).

As described above, rectangular pyramid 210 may be formed by four triangular plates 251-254 (herein also referred to as center triangular plates), which, in some cases, may have the same size and shape and may be joined together. Rectangular pyramid 210 may be at the center of a rectangular prism, and each edge 251C-254C may be parallel to a non-joined edge 221C-224C of the corresponding corner triangular plate 221-224.

As previously described, four roof elements 230-245 forming unit sub-cell 201, as shown in FIG. 2B, may be identical to roof element 130, as shown in FIG. 1D. For example, roof elements 230-245 may include eight trapezoidal plates (e.g., plates that are identical to plates 131 and 132 of roof element 130). In an example embodiment, roof elements 230-245 may be both adjacent to triangular pyramids (e.g., roof element 245 may be adjacent to pyramid 220) and adjacent to rectangular pyramid 210 (e.g., corner triangular plate 221 may be common to roof element 245, and pyramid 220, and center triangular plate 251 may be common to roof element 245 and pyramid 210). In various embodiments, non-joined edges of unit sub-cell 201 may be at the bottom side or at the top side.

Figure 2D:
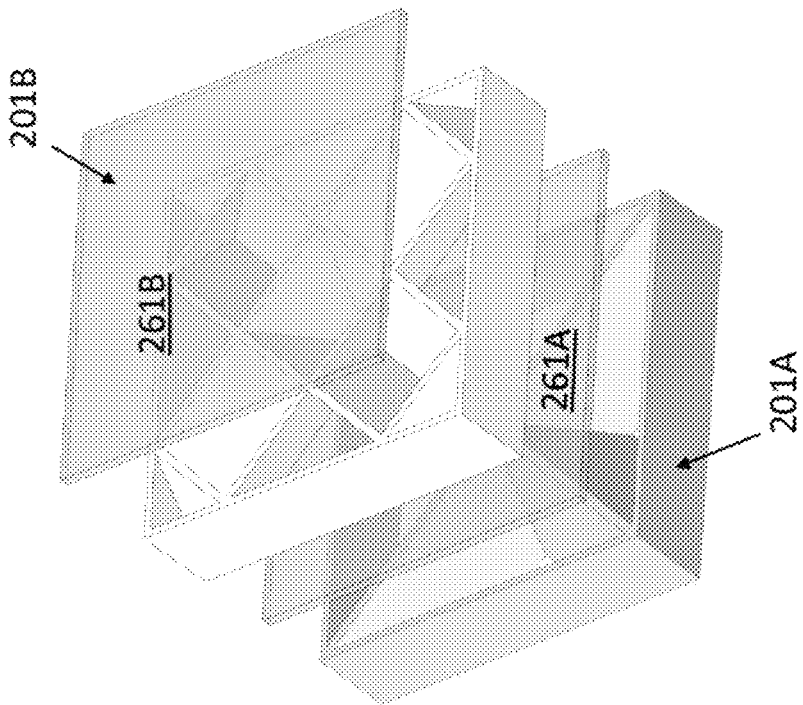
Figure 2C:
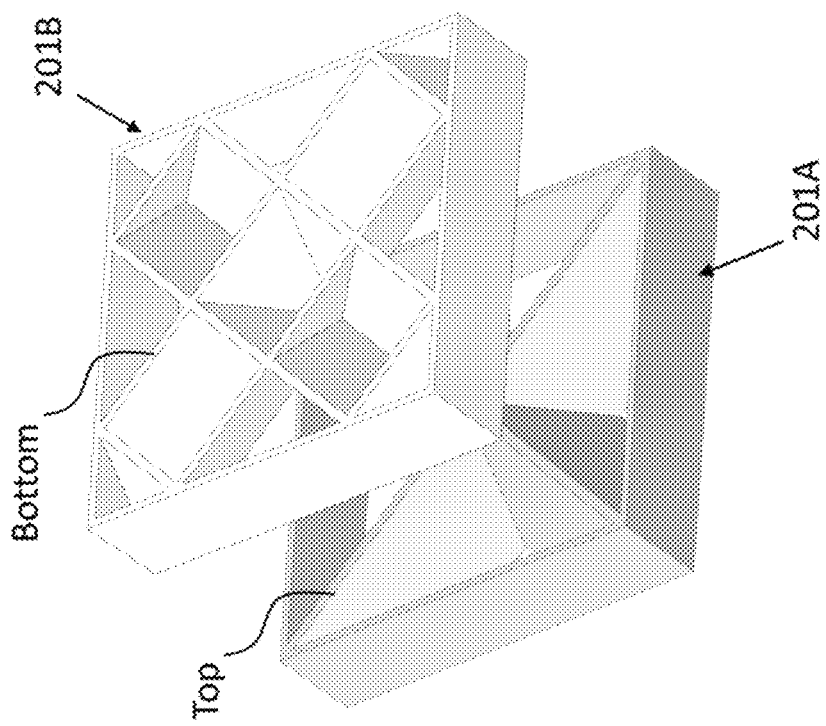

Similar to stacking of unit sub-cells 101A and 101B (as shown in FIG. 1H), unit sub-cells 201A and 201B may be stacked, as shown in FIG. 2C (201A may be identical to 201B, and identical to 201). In an example embodiment, the top side of sub-cell 201A may be joined with the top side of sub-cell 201B by joining all (or in some cases, some) top side edges of sub-cell 201A and corresponding top side edges of sub-cell 201B. Alternatively, the bottom side of sub-cell 202A may be joined with the bottom side of sub-cell 202B by joining all (or in some cases, some) bottom side edges of sub-cell 201A and corresponding bottom side edges of sub-cell 201B. In some cases, the top side of sub-cell 201A may be joined with the bottom side of sub-cell 201B. In some embodiments, as shown in FIG. 2D, horizontal plate 261A may be sandwiched and joined with sub-cell 201A and 201B (similar to how plate 151A was sandwiched and joined for sub-cells 101A and 101B). Additionally, plate 261B may be joined with sub-cell 201B (similar to how plate 151B was joined with sub-cell 101B).

As previously described, unit sub-cells 201A and 201B, as well as unit sub-cells 101A and 101B, may be stacked. In some cases, a unit cell may be formed by first stacking unit sub-cells 101A and 101B (as shown, for example, in FIG. 1H) forming a first sub-structure, stacking 201A and 201B (as shown, for example, in FIG. 2D) forming a second sub-structure, and then stacking the second sub-structure over the first sub-structure. For example, FIG. 2E shows an example of how sub-cells 101A-201B may be stacked. In an example embodiment, sub-cells 101A and 101B may be stacked to form a first sub-structure S1, and sub-cells 201A and 201B may be stacked to form a second sub-structure S2. Sub-structure S2 may be stacked over sub-structure S1, forming a unit cell UC. FIG. 2E schematically illustrates unit cell UC using element 270. Elements 270 (also referred to as a unit cell 270, or cell 270) have a top side (having sub-structure S2) and a bottom side (having sub-structure S1). Various stacks of cell 270 may be used. For example, stack C1 shows copies of cell 270 stacked such that top and bottom sides always alternate. Stack C2 shows another stacking where the top side is adjacent to another top side, and the bottom side is adjacent to another bottom side. Any other suitable stacking may be used.

Figure 2F:
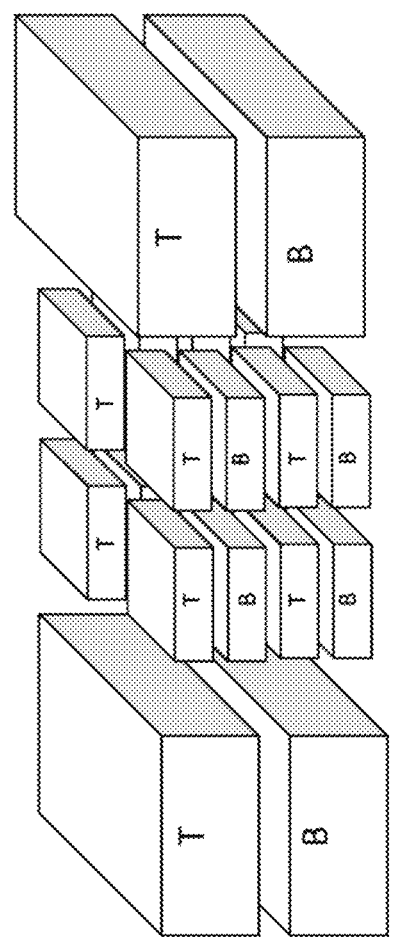

Additionally, unit cells 270 may be arranged in layers using any suitable arrangement. For example, FIG. 2E shows a layer L1 where a bottom side (a top side) of one unit cell is adjacent to a bottom side (a top side) of an adjacent unit cell (in both X and Y lateral directions, as shown in FIG. 2E). Alternatively, layer L2 may be formed such that a bottom side (a top side) of one unit cell is adjacent to a top side (a bottom side) of the adjacent unit cell (in both X and Y lateral directions). It should be noted that any other suitable arrangement of unit cells within a layer is possible, and any suitable stack of layers may be possible. Furthermore, it should be understood that various parameters of a unit cell may change throughout a lattice structure made from multiple unit cells. For example, material characteristics may be different from one unit cell to another. In some cases, the size of a unit cell may change, as shown in FIG. 2F.

The lattice structure may be formed from any suitable material (e.g., a metal, a plastic, a ceramic material, a dielectric, or a semiconductor). In some cases, plates forming unit cell 270 may be made from any suitable composite material. In some embodiments, the plates may include cavities.

The unit sub-cells 101 and 201 may further be configured such that rectangular prisms formed by plates 106-109 and 206-209 are of the same size and shape. In an example embodiment, a base of these rectangular prisms may be a square. In some cases, as shown, for example, in FIG. 2A, rectangular pyramid 210 may have a base which is a square (since edges 251C-254C are of the same length and any two neighboring edges are perpendicular to each other. In an example embodiment, edges 221C-224C may have the same length as edges 251C-254C. In some embodiments, as shown in FIG. 2A, edges 251C-254C are parallel to corresponding edges 221C-224C. In various embodiments, edges 121A and 122A, as well as other similar edges of triangular pyramids, such as pyramid 120 as shown in FIG. 1F, may be of the same length and perpendicular to each other. In various embodiments, unit cell 270, as shown in FIG. 2E, may have a size in a range of a few nanometers to a few meters. In various embodiments, a scale for unit cell 270 may be dictated by an application of the lattice structure. For example, small scale lattice structures (e.g., structures with unit cell being less than one millimeter in size) may be used for medical application (e.g., prosthetics) while large scale lattice structures (e.g., structures with unit cells size being larger or comparable to one meter) may be used for fabrication of building walls, floors, ceilings, or other engineering structures (e.g., bridge elements, and the like).

Figure 3C:
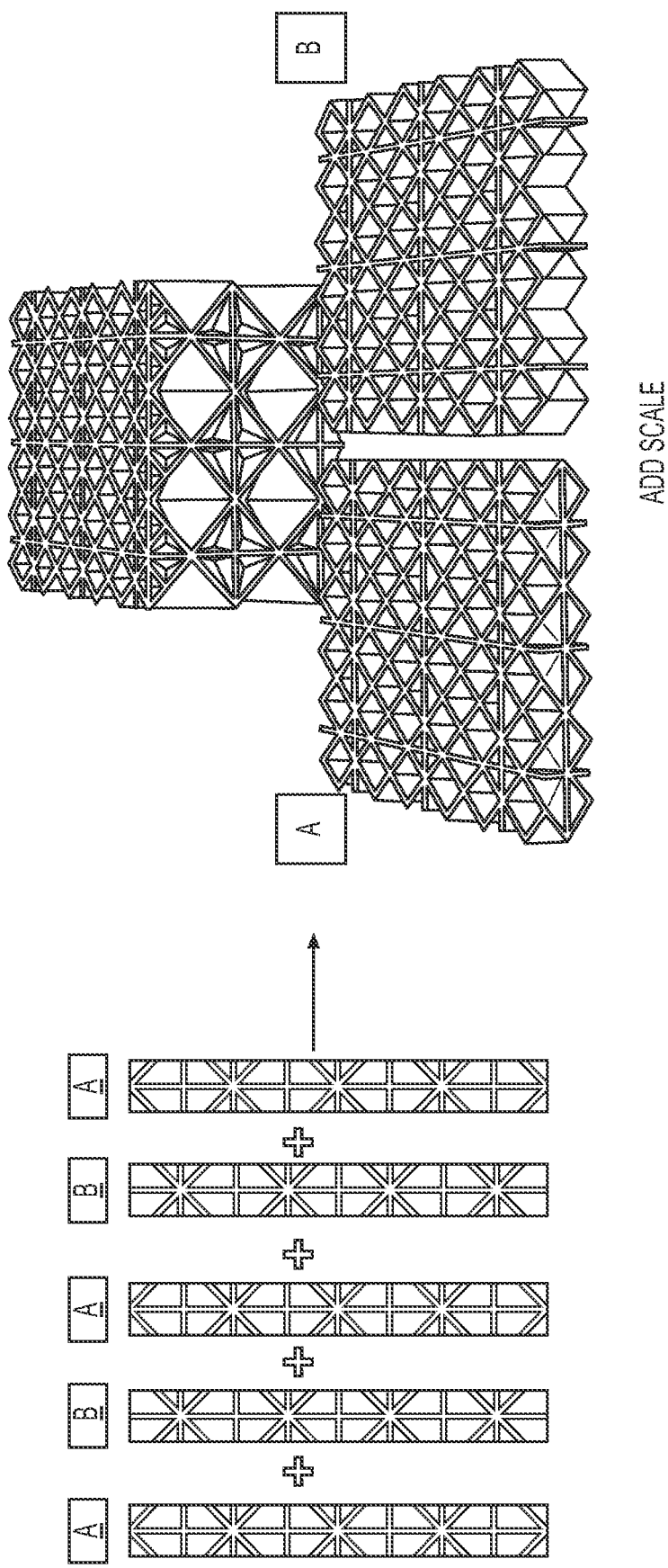

FIG. 3A shows an example views of a layer of a stack of unit sub-cells 101A and 101B, and FIG. 3B shows an example view of a layer of a stack of unit sub-cells 201A and 201B. FIG. 3C shows a three-dimensional view of unit sub-cells 101 and 201. In an example embodiment, a lattice structure A corresponds to a layer of unit sub-cells 201A stacked with unit sub-cells 201B (as shown in FIG. 2D), and lattice structure B corresponds to a layer of unit sub-cells 101A stacked with unit sub-cells 101B, as shown in FIG. 1H.

Figure 4A:
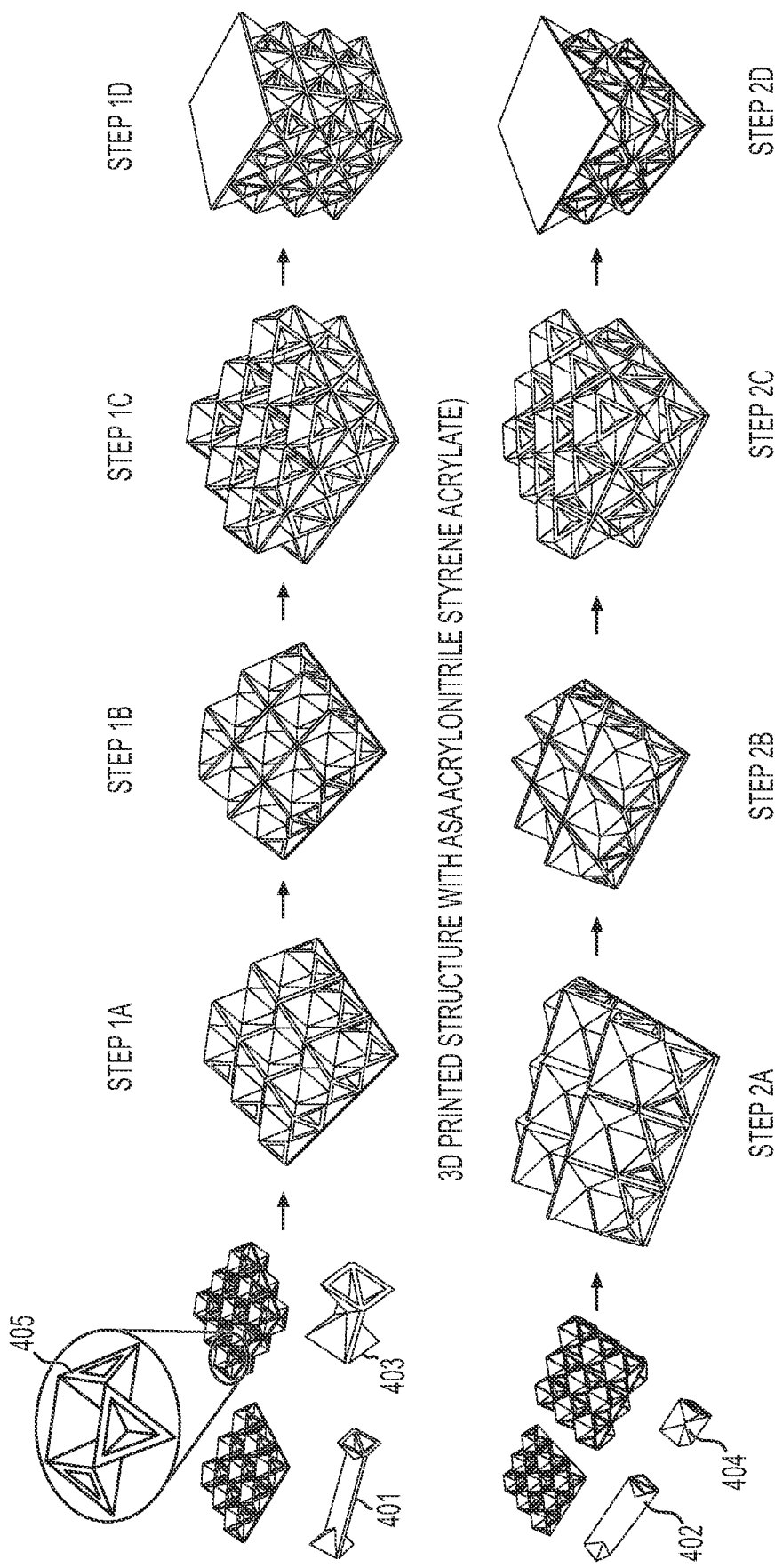

Unit sub-cells 101 and 201 may be one example of possible unit cells that include joined plates. It should be appreciated that other unit cells may be possible that may include rectangular, triangular, or/and trapezoidal plates. For example, FIG. 4A shows example unit sub-cells 401-405 for making at least some layers of lattice structures as shown in steps Step 1A-Step 1D and steps Step 2A-Step 2D. In an example embodiment, vertical and horizontal plates may be added as shown in final structures (steps Step 1D and Step 2D). As shown in FIG. 4A, three-dimensional lattice structures are made using additive manufacturing via a three-dimensional (3D) printing method using, as an example, acrylonitrile styrene acrylate. FIG. 4B shows a zoomed view of unit sub-cells 401-405, and layers of lattice structures build from these sub-cells, while FIG. 4C shows different views of the formed lattice structures. FIG. 4D shows lattice structures formed using a 3D printing approach with multiple rectangular and triangular plates combined to form various unit cell structures. In various embodiments, the orientation of plates is selected to optimize mechanical, thermal, or other properties of lattice structures. FIGS. 4E and 4F show yet other lattice structures fabricated from at least some of sub-cells 401-405.

Figure 4H:
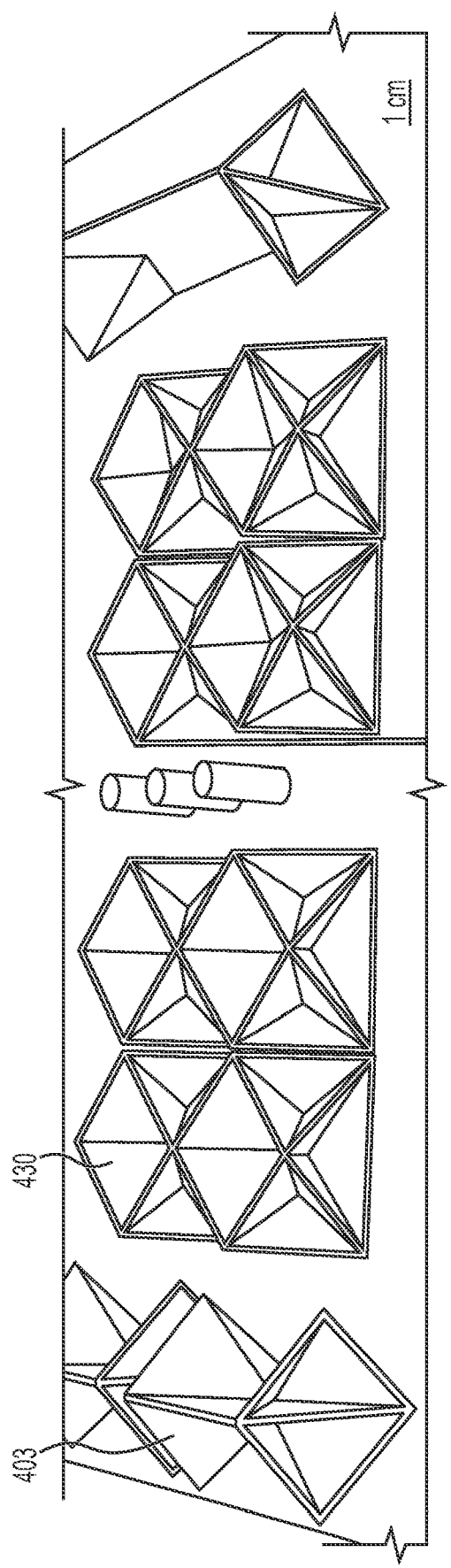

FIG. 4G shows horizontal plate 411 that can be used to connect various layers 421A-421C of lattice structure 420. Various views of structure 420 (e.g., view 1 and view 2) are also shown, with structure 420 formed using the 3D printing approach. FIG. 4H shows unit sub-cell structures 403 and 430 formed from a metal sheet prior to assembling these unit sub-cell structures into a lattice structure.

Figure 5A:
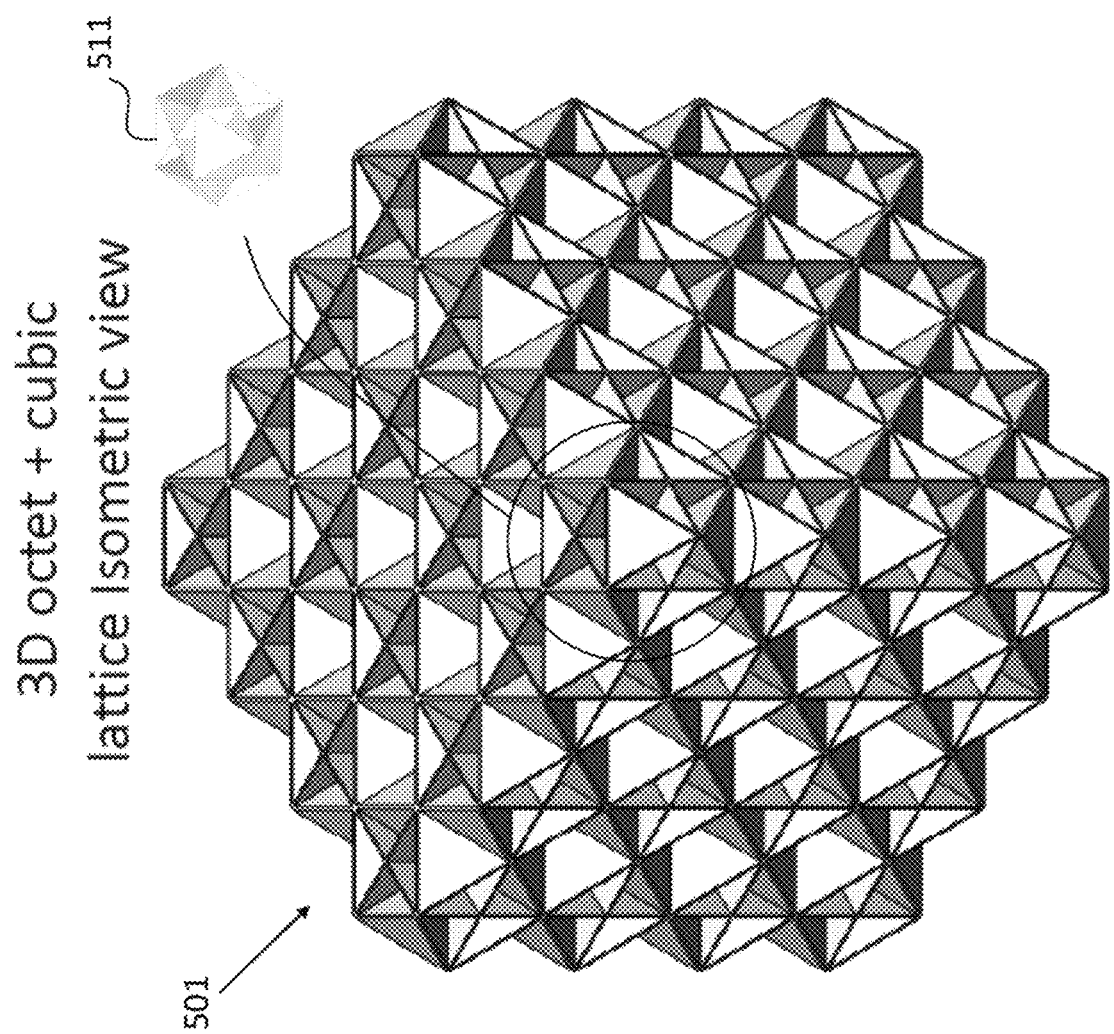
FIGS. 5A-5C show an example of a lattice structure based on a three-dimensional octet cubic unit cell, consistent with disclosed embodiments.
Figure 5B:
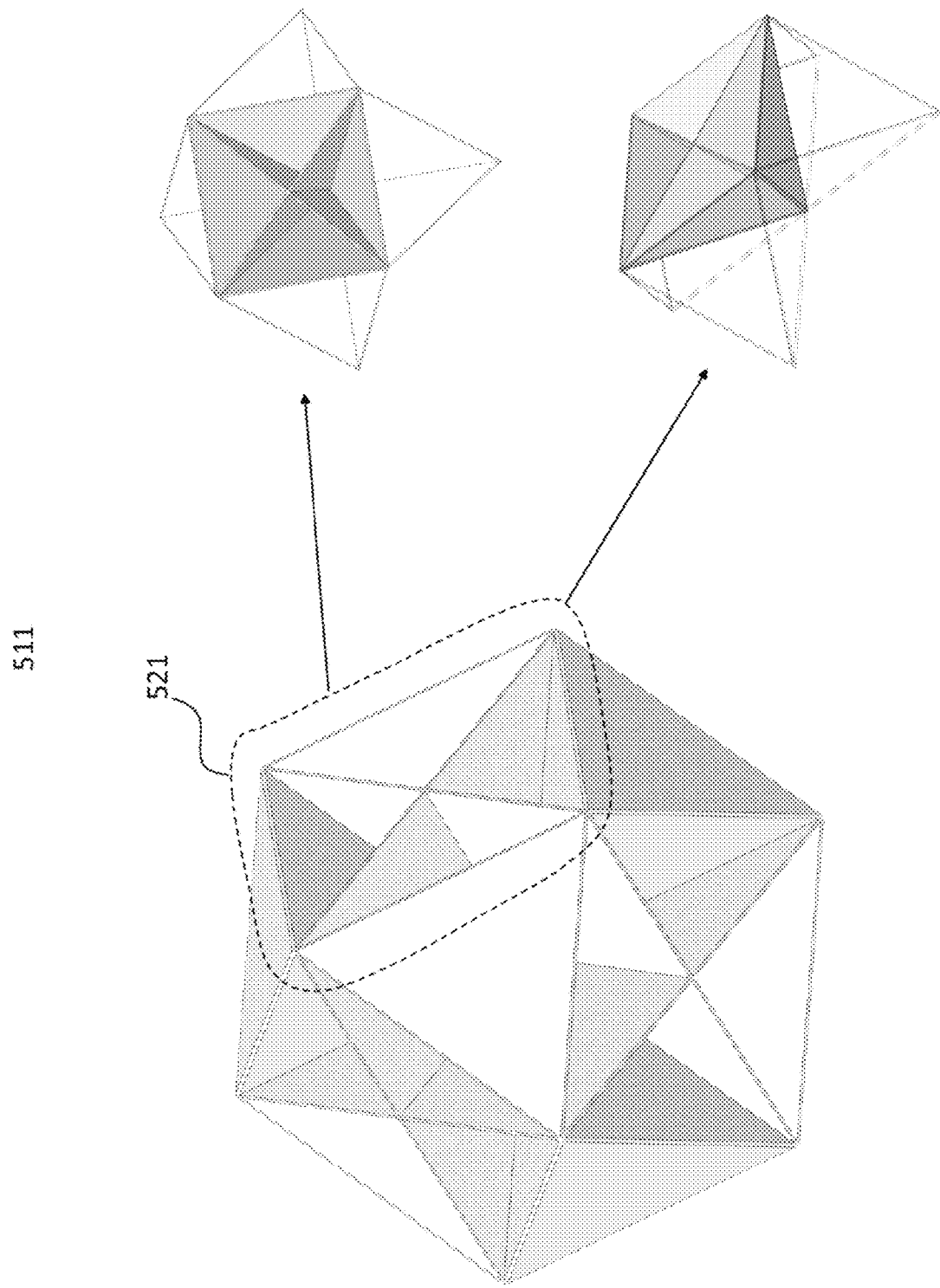
Figure 5C:
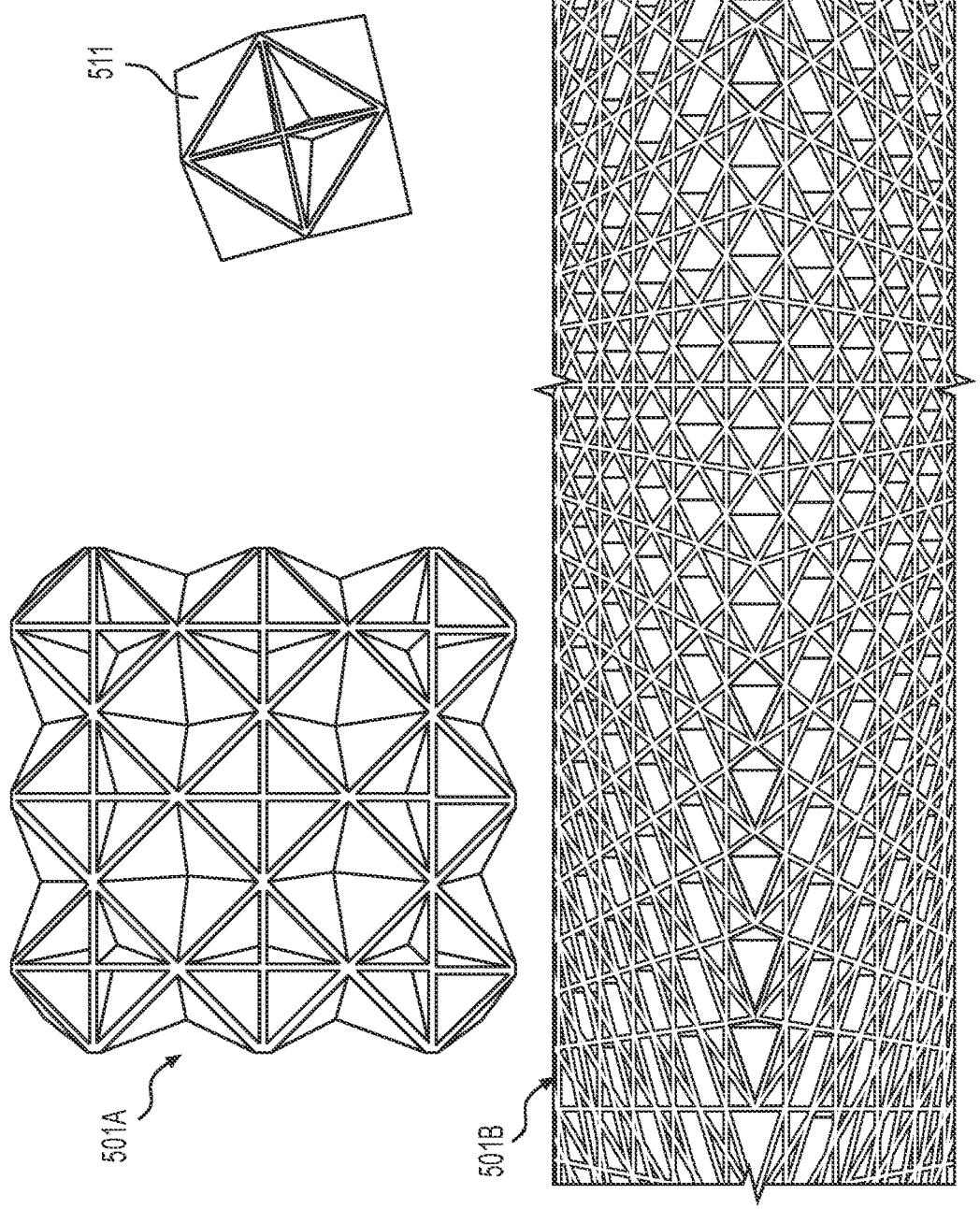

Another embodiment of a lattice structure 501 made from octet cubic elements 511 is shown in FIG. 5A. FIG. 5B shows further details of octet cubic element 511, where a sub-element 521 is further shown from different angles. FIG. 5C shows octet cubic element 511 made from metal and corresponding structures 501A and 501B. While lattice structures made from octet cubic elements 511 may have superior mechanical properties than other lattice structures, fabrication of such octet-based lattice structures may be complicated (or expensive) due to octet cubic elements 511 forming closed cell lattice structure (e.g., cell lattice with entrapped air). In some cases, open cell lattice structure may be preferred, since it may be difficult to make closed cell lattices using additive manufacturing methods. For instance, during the additive manufacturing, the overhangs of a structure based on closed cells may require support structures that cannot be removed from internal cavities post-build. The open cell cross sections or sub assembly parts of these structures may be easier to fabricate using additive manufacturing.

In an example embodiment, lattice structure may be fabricated by combining several octet cubic elements (e.g., elements 611A and 611B) to form a layer 620A and stacking one layer of octet cubic elements (e.g., layer 620A) over another upside-down layer (e.g., layer 620B) of octet cubic elements layers, as shown in FIG. 6. In an example embodiment, a horizontal plate 613 may be placed between layers 620A and 620B to result in a portion of lattice structure 630.

FIG. 7 shows that octet cubic element 711 may be modified such that holes or openings 705 are introduced in at least some of the plates resulting in element 712. For example, the holes may be cut in tetrahedral faces as well as horizontal plates. Although a circular hole is illustrated in FIG. 7, this is only exemplary. In general, these holes may have any size and shape. Multiple copies of element 712 may be combined to form a lattice structure 701. A structure 702, which may be geometrically similar to structure 701, is shown to be fabricated via an electron beam melting powder bed additive manufacturing. In an example embodiment, lattices containing structures 701, 702, or similar structures may have a low relative density of a few percent, a few tens of percent, and the like. For example, structure 702 has a relative density of seventeen percent (herein, the relative density is defined as a mass of material in a unit volume of a lattice structure divided by a density of the material).

FIG. 8 shows that lattice structure 701 based on octet cubic elements has a high Young's modulus. For instance, lattice structure 701 may tolerate high strains of up to five percent (or in some cases, depending on a material for structure 701, even ten percent) before undergoing plastic deformations. As shown in FIG. 8, buckling of lattice structure 701 may start at strains of about ten percent. Further, even at strains of 32% lattice structure 701 absorbs such strains while retaining at least some of the layers. Such absorption of high strains results in lattice structure 701 being useful for applications requiring absorption of impact energy (e.g., lattice structure 701 may be used for fabrication of helmets, armor, and the like).

Figure 9A:
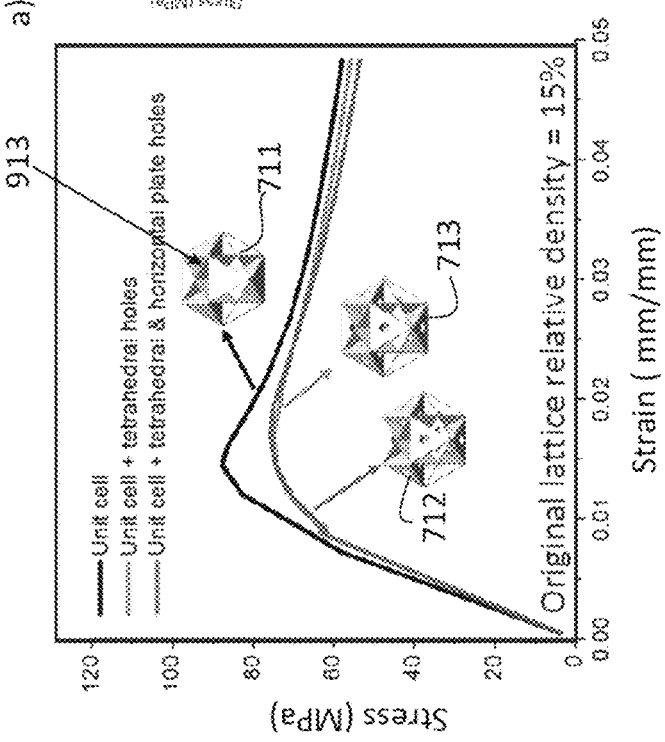
FIGS. 9A-9B show possible stresses due to strains within a lattice structure formed from a three-dimensional octet cubic unit cell, consistent with disclosed embodiments.

FIG. 9A shows that lattice structures made from an element 712 or an element 713 (element 713 includes holes only in tetrahedral faces) may have Young's modulus of about 0.48, while lattice structures made from an element 711 may have Young's modulus of about 0.5. Even though Young's modulus is slightly reduced for structures made from element 712 (or 713), gains resulted from reduced relative density due to the presence of holes are significant. For example, a lattice structure made using element 711 that has the same relative density (due to elements 711 in such lattice being larger than elements 712) as the one made from element 712 (or 713) may have a Young's modulus that is about 4.3 times smaller than Young's modulus of a lattice made from element 712 (or 713). It should be appreciated that holes of any suitable size may be cut out to further select the relative density and strength of element 712 (or 713). For example, Further, the holes may be of any suitable shape. Additionally, more than one hole may be fabricated in a tetrahedral face and/or horizontal plane of element 712. In some cases, the holes may be filled with a material that is different from the material of element 712. For example, the material filling holes of element 712 may have different thermal, electrical, optical, or mechanical properties than the material of element 712. As shown in FIG. 9A, element 711 (as well as elements 712 and 713) may include cavities such as cavity 913. In some embodiments, these cavities may be filled with a material that is different from the material of element 711. In some cases, such a filling material may be solid, liquid, or gas. In an example embodiment, such a filling material may have different thermal, electrical, optical, or mechanical properties. Having cavities, such as cavity 913, may enable fluid flow (e.g., gas flow) or acoustic damping within a lattice structure formed from elements 712 (or 713). Such fluid flow may be important for avoiding pressure differences between the inside of the porous lattice structure and the external environment, since such pressure difference may lead to a damage of the lattice structure (e.g., bursting). FIG. 9A indicates that lattice structures based on octet cubic elements 711, 712, or 713 may withstand maximum stresses of about 90 megapascals (MPA) prior to plastic deformation. Such stresses are substantially larger (approximately by a factor of 2) than maximum stresses that can be tolerated by an octet truss lattice made from the same material.

Figure 9B:
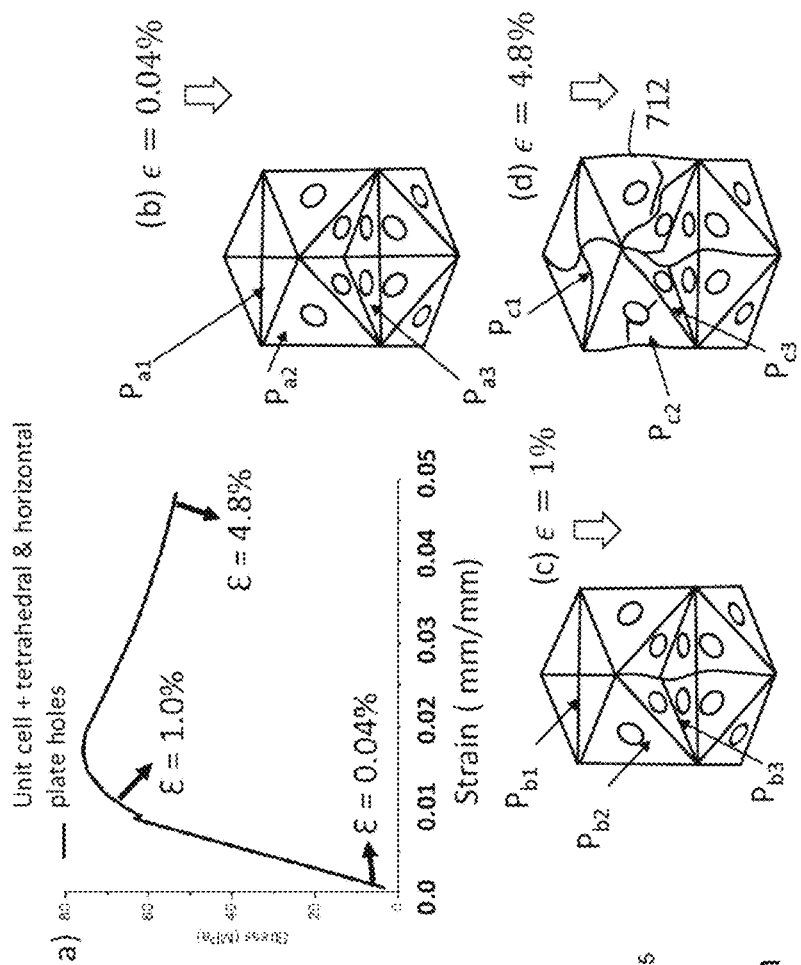

FIG. 9B shows von Mises stresses that is an indicator for predicting yielding of element 712 under various values of strains. As seen under high strains of about five percent, octet cubic element 712 may start exhibiting buckling. As shown in FIG. 9B, a Young's modulus for lattice structure made from element 712 is relatively constant for strains between one and five percent.

Aspects of the present disclosure further describe a method of forming a lattice structure from repeated unit cells, where each unit cell may be made from multiple shapes. An example shape may be fabricated using plates and may be an incomplete triangular pyramid, an incomplete triangular prism, an incomplete rectangular prism, or an incomplete rectangular pyramid. In some cases, a three-dimensional shape may be a unit sub-cell such as sub-cells 101, 201, 401-405, and the like. In some cases, the three-dimensional shape may be a portion of a unit sub-cell (e.g., shape 113, as shown in FIG. 1E).

The method of forming the lattice structure may include fabricating the plurality of shapes by first cutting patterns (herein, also referred to as cut pattern) from a sheet of a material (e.g., cutting patterns from a metal sheet or any other suitable material that may be folded and/or joined with other patterns made of the same (or different) material). The fabrication may also include forming (e.g., cutting) additional patterns (e.g., holes) in the sheet of the material, folding some of the regions of the cut pattern, joining an edge of one of the regions (herein also referred to as a plate) with an edge of another plate (another plate may be another region of the same cut pattern or a region of a different cut pattern), or joining an edge of one of the plates with a surface of another one of plates. After completion of cutting patterns and joining edges with other edges or surfaces, a unit sub-cell may be formed. While the unit sub-cell may include incomplete shapes, after joining multiple unit sub-cells, the incomplete shapes may be completed. For example, completed shapes may include a completed triangular pyramid, triangular prism, rectangular prism, or rectangular pyramid. In some cases, boundaries of a lattice structure (i.e., external layers of the lattice structure) formed by the method described herein may include incomplete shapes while all the internal layers of the lattice structure may include only completed shapes.

Figure 10:
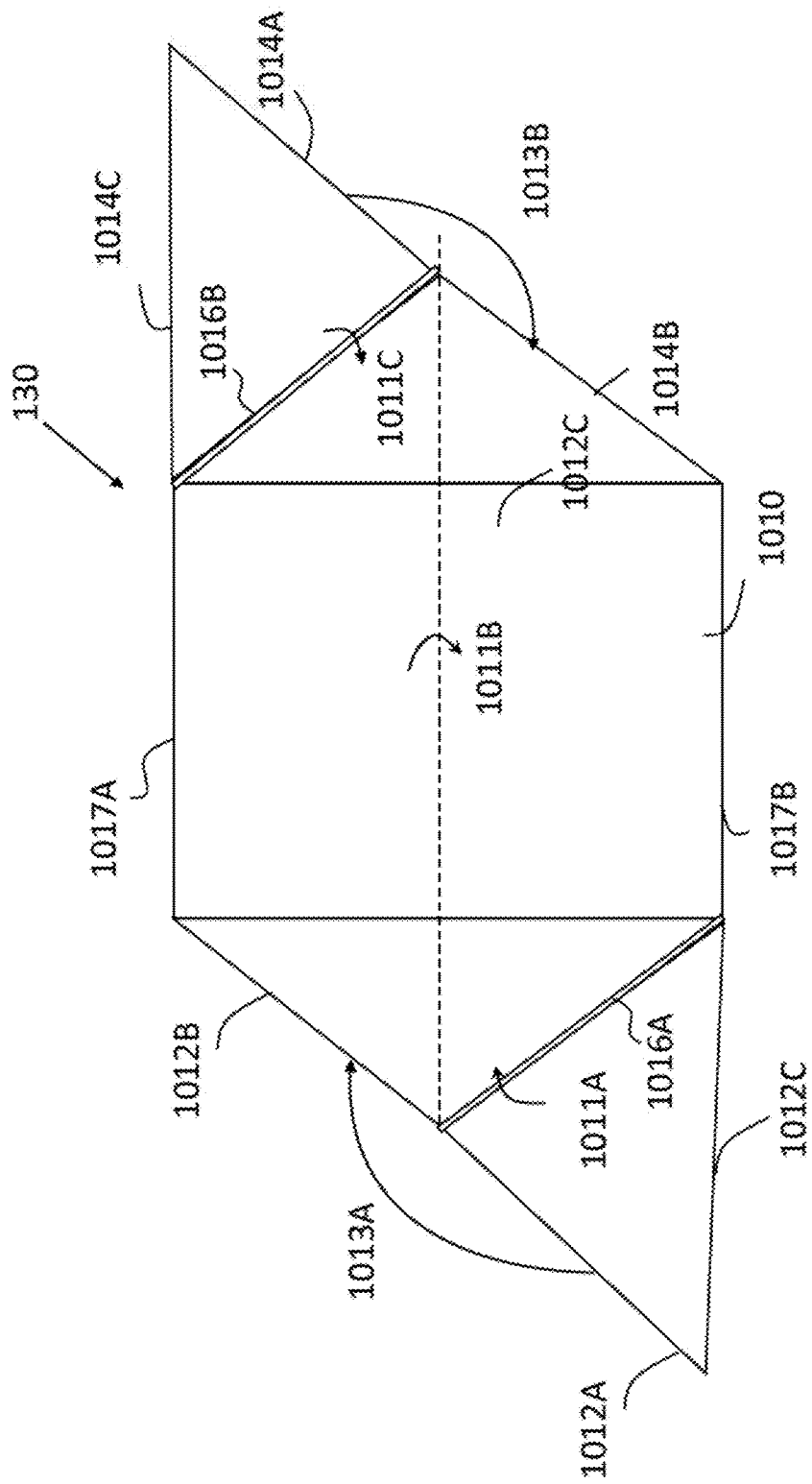
FIG. 10 shows a cut-out shape of an element for the fabrication of a lattice structure, consistent with disclosed embodiments.

In an example embodiment, shapes may be joined using any suitable approaches. For example, the shapes may be joined using welding, gluing, mechanical joints (e.g., bolts, ropes, clips, etc.), chemical bonding, and the like. In an example embodiment, as shown in FIG. 10, structure 130, as previously shown in FIG. 1D, may be obtained by cutting a shape 1010, and folding using arrows 1011A-1011C, joining edges 1012A with 1012B as shown by arrow 1013A, and joining edges 1014A with 1014B as shown by arrow 1013B. In an example embodiment, regions 1016A and 1016B may be configured to take into account the thickness of sheet material forming shape 1010. Further lengths of edge 1012C and 1014C may be selected to be the same as edges 1017A and 1017B.

Figure 11:
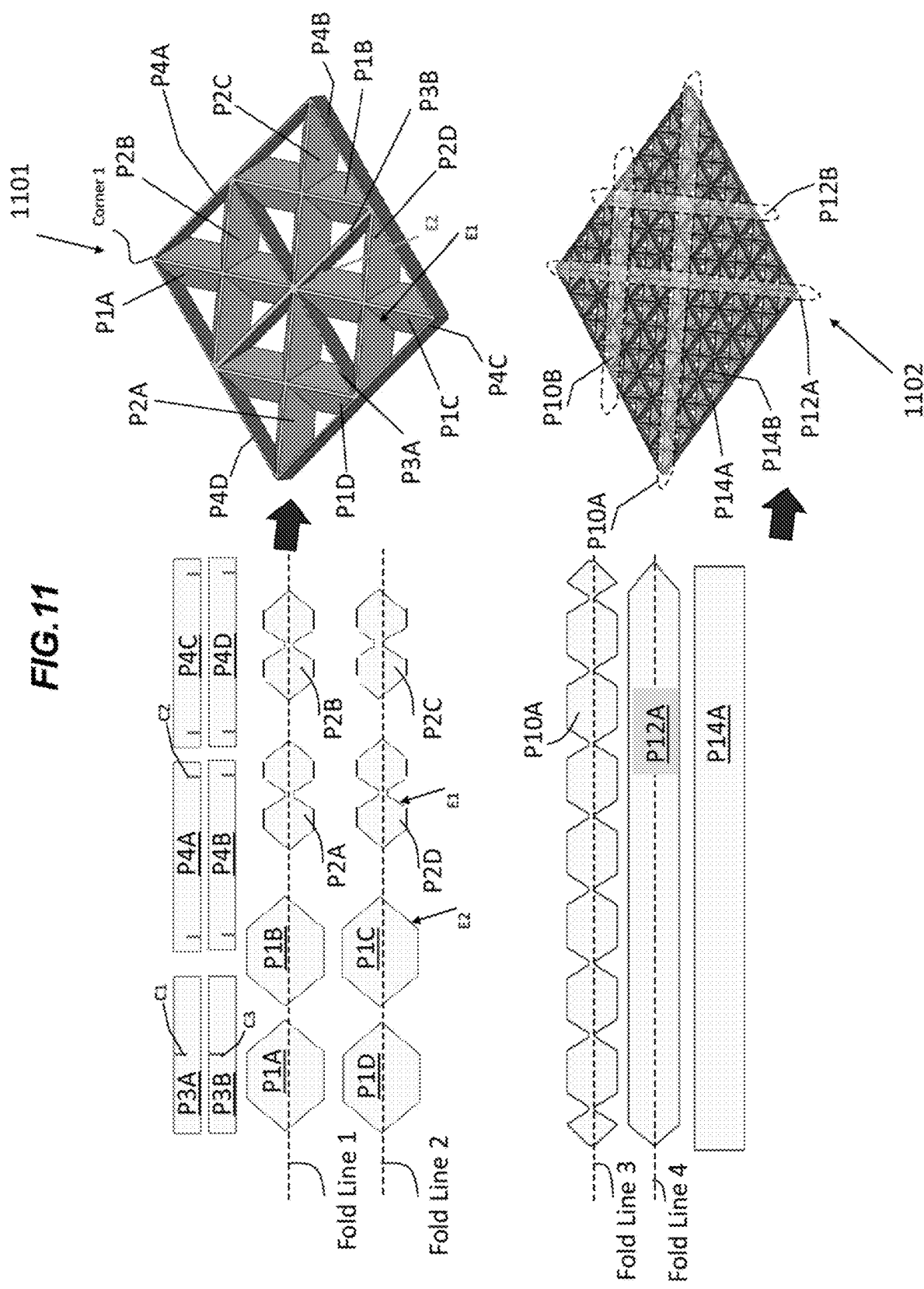
FIG. 11 shows cut-out elements for the fabrication of a lattice structure, consistent with disclosed embodiments.

FIG. 10 shows one example approach of forming shapes from a cut pattern using folding and joining; however, any other suitable approaches may be used. In an example embodiment, as shown in FIG. 11, unit sub-cell 1101 may be made from folded and joined shapes (herein also referred to as elements or patterns) P1A-P2D, joined with rectangular elements P3A-P4D, as shown in FIG. 11. For example, elements P1A-P2D may be folded at a fold line 1 and a fold line 2 and connected at respective edges. For example, edge E1 of element P2D may be joined with a surface of element P1C, and edge E2 of element P1C may be joined with a surface of P3B. Similarly, other elements P1A-P1D may be joined with elements P2A-P2D along edges. In an example embodiment, rectangular elements may have cuts, such as cut C1 and C3, that may allow element P3A to be joined with P3B in the center of unit sub-cell 1101 (e.g., cuts C1 and C3 may be aligned to result in a joined structure). Further, cuts in elements P4A-P4D, such as an example cut C2, may be used to join P4A-P4D at corners of unit sub-cell 1101, such as a Corner 1, as shown in FIG. 11.

Figure 12:
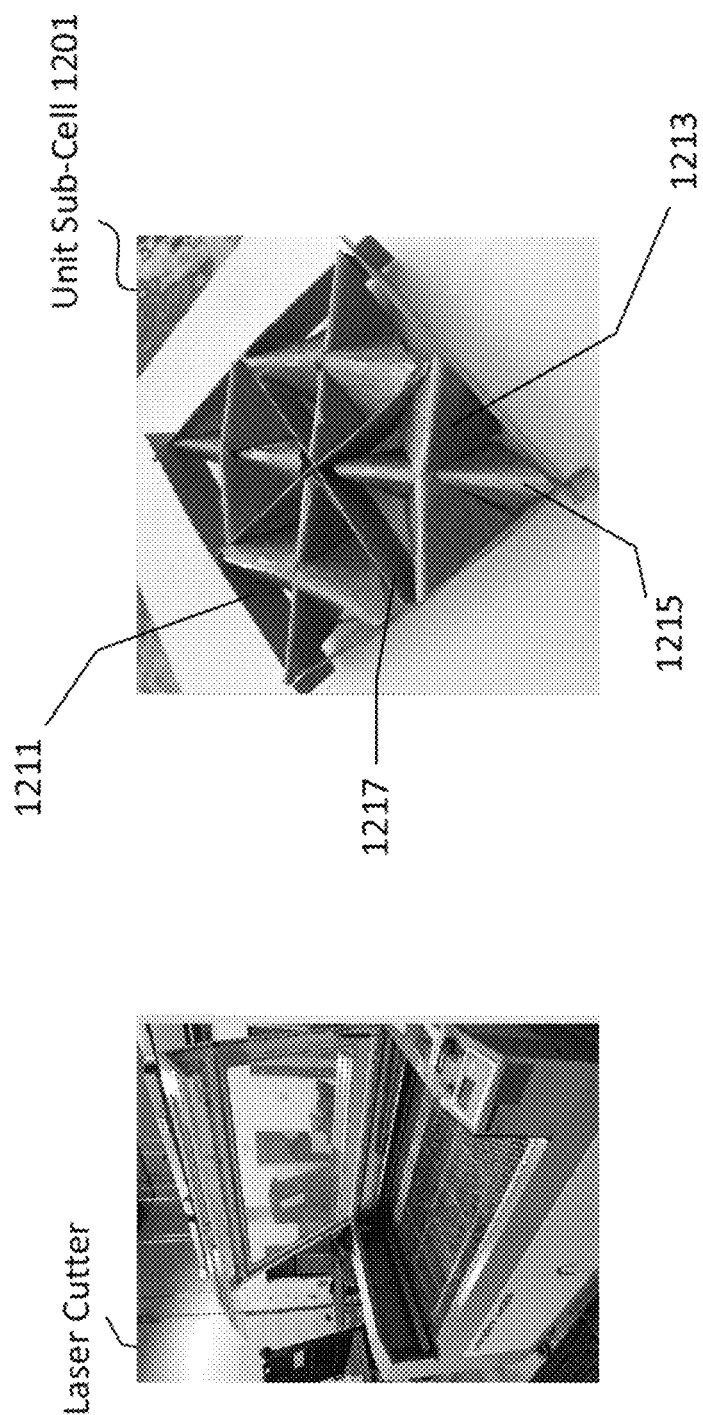
FIG. 12 shows example cut-out elements for the fabrication of a lattice structure made from cardboard, consistent with disclosed embodiments.

FIG. 11 also shows a periodic structure 1102 containing multiple unit sub-cells 1101. Such structures may be made from periodic shapes. A few examples of such shapes P10A, P12A, P14A are shown as flat cut-outs (i.e., cut patterns as described above). Shapes P10A, P12A may be folded along respective fold lines 3 and 4, as shown in FIG. 11, and combined to form structure 1102. In an example embodiment, elements P10A and P12A form elements along diagonals of structure 1102. Similar elements, such as P10B and P12B (which may be similar but shorter than respective elements P10A and P12A), may be used to form other portions of structure 1102. In various embodiments, rectangular elements such as P14A and P14B may be used to complete structure 1102, as shown in FIG. 11. FIG. 12 shows an example fabricated unit sub-cell 1201 using cardboard cut-out shapes 1211-1217, which may be cut using a laser cutter. In an example embodiment, shape 1211 may be similar to element P4A, shape 1213 may be similar to element P2A, shape 1215 may be similar to element P1A, and shape 1217 may be similar to element P3A.

Figure 13:
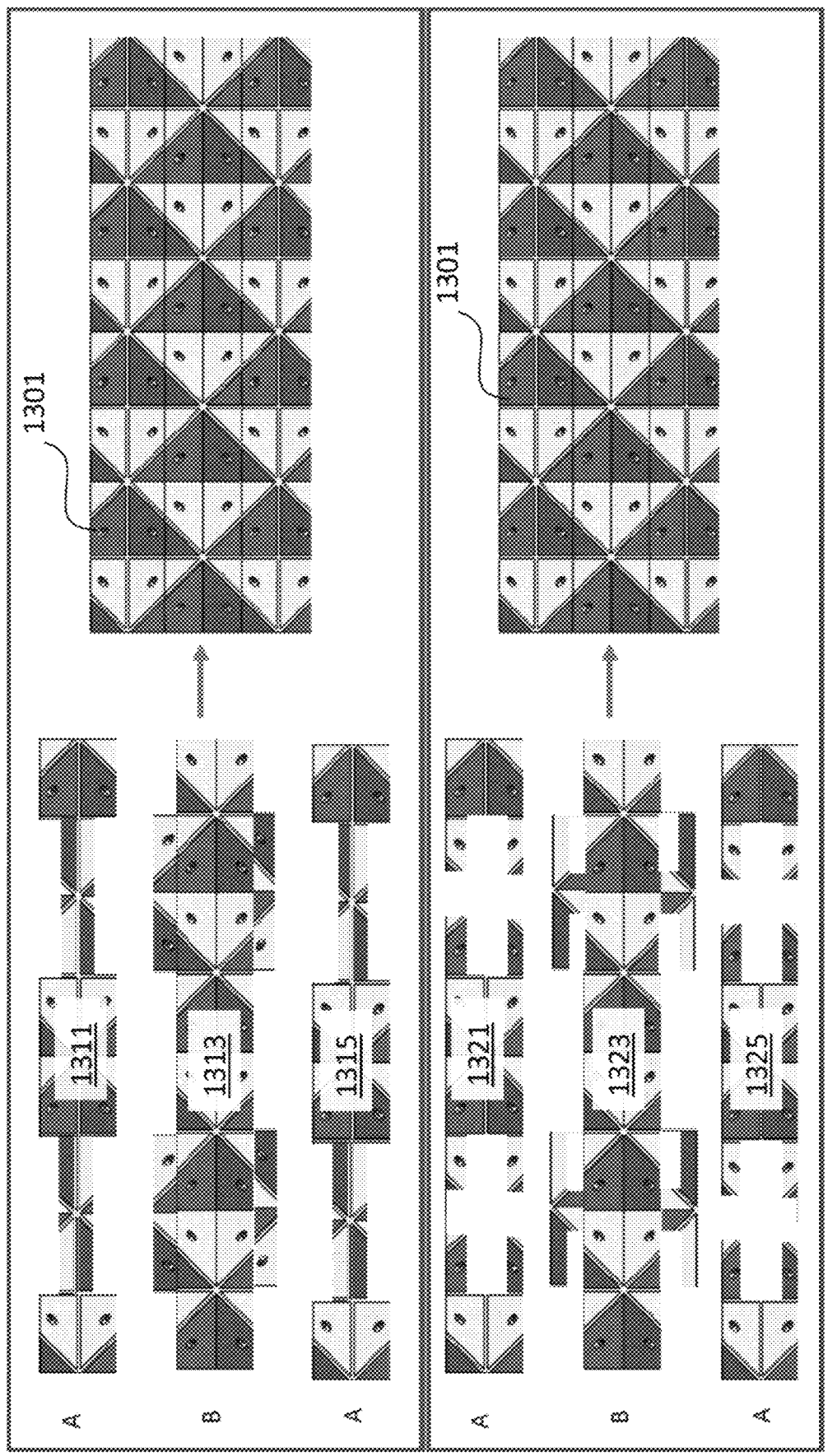
FIG. 13 shows possible layers for forming a lattice structure, consistent with disclosed embodiments.

FIG. 13 shows a lattice structure 1301 formed from cubic octet elements. Structure 1301 may be formed using joined layers such as layers 1311-1325. It should be appreciated that layers with any suitable complex boundary may be used, provided that these layers form a lattice structure 1301 when assembled and joined together (e.g., layer boundaries may be similar to boundaries of elements in a jigsaw puzzle).

In various embodiments, as discussed above, a lattice structure may be assembled via cutting shapes, folding the shapes, and joining the shapes. In an example embodiment, manufacturing of the lattice structure may have an associated cost function $g(C,F,J)$ where C is a cost of cutting a shape, F is a cost of making folds, and J is a cost of making joints. In an example embodiment, function g may be a weighted average of costs C, F, J such as $g=w_1C+w_2F+w_3J$, where $w_1$, $w_2$, and $w_3$ are weights of the weighted average. In an example embodiment, a set of optimal shapes may be determined analytically to minimize the overall cost function g for producing a lattice structure. In some cases, cost C may depend on the number of cuts, lengths of cuts, and/or orientation of cuts relative to each other. Cost F may depend on the number of folds, lengths of folds, and/or orientation of folds relative to each other. Cost J may depend on a number of joined edges, a type of a joint (e.g., whether an edge is joined to another edge or whether an edge is joined to a surface), ease of access to a joint, a length of a joint, and the like.

In an example embodiment, costs for cutting shapes (cost C) may be decreased if a large number of parts are identical. For example, if multiple shapes may be cut simultaneously from a stack of sheets, the cost may be reduced. Thus, cutting cost C (and in some cases, folding and joining costs F and J) may be reduced via manufacturing at a scale, and such reduction may be determined analytically to minimize the overall cost function g for producing a lattice structure.

Top-down manufacturing via cutting shapes, folding, and joining the shapes is one possible approach for forming a lattice structure. In some cases, the lattice structure may be formed via a three-dimensional (3D) printing method (e.g., via curing a resin using ultraviolet light, metal sintering or melting, powder bed fusion, fused filament fabrication, or any other suitable 3D printing approach known in the art). In some cases, a self-assembly approach may be used to fabricate a lattice structure (or at least some elements of the lattice structure).

In various embodiments, a software application may be designed to control some or all of the aspects of fabrication of the lattice structure. The software application may be configured to control devices for cutting, folding, or joining various shapes when a top-down fabrication is used. Alternatively, a software application may be configured to control any aspects of the 3D printing approach. In some cases, the software application may be configured to determine the most cost-efficient approach for forming the lattice structure by selecting a process that minimized a cost function $g(C, F,J)$. The software application may be executed by one or more processors, which may be configured to send commands to various devices, robotic arms, machines, etc., that may be used for fabricating the lattice structure.

During a fabrication process of a lattice structure, a set of sensors may be used to evaluate adherence of a process to a standard protocol (e.g., each step of the process may be evaluated for adherence to a standard protocol). In some cases, parts of a lattice structure may be tested for quality using any suitable sensors (e.g., cameras, strain measuring devices, stress measuring devices, and the like) and suitable actuators (e.g., pressing devices, twisting devices, robotic arms, heating and cooling devices, etc.). In some cases, mechanical, electrical, and thermal measurements of the formed lattice structure may be performed to determine the adherence of the lattice structure to a standard protocol. For example, a steady or time-dependent electrical current may be induced in the lattice structure, or/and steady or time-dependent thermal conductivity may be measured within the lattice structure. In some cases, sensors may be configured to measure environmental factors (e.g., the temperature of the environment, the humidity of the environment, gases present in the environment, and the like). Information from the sensors may be used as feedback to the software application for adjusting any suitable aspects of fabrication of the lattice structure (e.g., controlling a temperature of a sheet material from which the lattice structure is made, controlling a speed at which the lattice structure is made, controlling duration for joint solidification, controlling an intensity of exposure of a resin during an additive manufacturing process, and the like).

FIG. 14A shows an example process 1401 for fabricating a lattice structure, consistent with disclosed embodiments. At step 1411 of process 1401, a plurality of shapes may be fabricated by cutting the shapes from a sheet of material (e.g., metal, plastic, and the like). At step 1413, the shapes may be folded, and at step 1415, the shapes may be joined together (e.g., via soldering, gluing, etc.) In an example embodiment, the shapes may be joined such that an edge of one shape is joined with an edge of another shape. Additionally, or alternatively, the shapes may be joined such that an edge of one shape is joined with a surface of another shape. After completion of the joining, the resulting lattice structure may include 3D shapes such as triangular prisms, rectangular prism, or rectangular pyramids.

Another exemplary fabrication process 1402 is shown in FIG. 14B, consistent with disclosed embodiments. At step 1421 of process 1401, a plurality of shapes may be fabricated via additive manufacturing (a 3D printing approach) as described above. At step 1423, the shapes may be joined together via additive manufacturing. Alternatively, the shapes may be joined via soldering, gluing, etc. In some cases, an entirety of a lattice structure may be fabricated using the 3D printing approach. In an example embodiment, multiple polymers may be used for fabricating the lattice structure, and some of the polymers may be extracted through cavities within some of the plates of the lattice structure.

Additive manufacturing, such as 3D printing approach, may be one of possible manufacturing approaches. Alternatively, various elements (e.g., plates, of shapes) may be fabricated using subtractive manufacturing, injection molding, forming, or joining manufacturing. In an example embodiment, subtractive manufacturing may include successively cutting material away from a solid block of material (e.g., machining using suitable machines such as drill press, grinding machine, milling machine, and the like). Injection molding may include injecting molten material (e.g., metal, glass, or plastic) into a suitable mold. Forming may include extrusion of material, material folding, as well as any suitable mechanical deformation of the material. Joining manufacturing may include welding, brazing, soldering, or adhesive bonding of elements.

Any type of component (e.g., paddings for helmets, aeronautical components, such as airplane wings and airplane fuselage parts, or any other components of devices or machinery that may benefit from lightweight, high-strength materials) may be formed using the lattice structures described herein. A non-exhaustive list of possible applications for using the disclosed lattice structures may include heat pipe system, structures, or devices, heat sink system, thermal management systems (TMS), ballistic resistant and mitigation systems, projectile resistant and mitigation systems, missile resistant and mitigation systems, blast resistant and mitigation systems, heat resistant systems, electrical insulating systems, armor plating systems, armor systems, smart memory alloys (SMA), architectural structures (e.g., pillars, walls, shielding, foundations or floors for tall buildings or pillars, wall shielding floors, for regular buildings and houses), civil engineering field structures (for example: road facilities such as noise resistant walls and crash barriers, road paving materials, permanent and portable aircraft landing runways, permanent or portable landing pads, pipes, segment materials for tunnels, segment materials for underwater tunnels, tube structural materials, main beams of bridges, bridge floors, girders, cross beams of bridges, girder walls, piers, bridge substructures, towers, dikes and dams, guide ways, railroads, ocean structures such as breakwaters and wharf protection for harbor facilities, floating piers/oil excavation or production platforms, airport structures such as runways), military security/protection/defense structures, machine structures (e.g., frame structures for carrying system, carrying pallets, frame structure for robots, etc.), automobile structures (e.g., body, frame, doors, chassis, roof and floor, side beams, bumpers, etc.), ship structures (e.g., main frame of the ship, body, deck, partition wall, wall, etc.), freight car structures (e.g., body, frame, floor, wall, etc.), aircraft structures (e.g., wing, main frame, body, floor, etc.), spacecraft structures (e.g., body, frame, floor, wall, etc.), space station structures (e.g., the main body, floor, wall, etc.), submarine, ship or water craft structures (e.g., body, frame, etc.). parts for marine vessel hulls or decks or parts for hovercraft, and other amphibious vehicles, frames to any air, space, or water craft, vehicle or robot, outer skin or inner skin, as well as other components, of any air, space, or water craft, vehicle or robot. Further lattice structures may be used as prosthetic structures such as prosthetic joints, prosthetic legs, arms, and the like, as well as parts of various medical equipment.

A non-exhaustive list of possible materials used for forming lattice structures described herein may include various metals (e.g., steel, aluminum, copper, silver, gold, titanium, chromium, iron, stainless steel, galvanized steel, nickel, zinc, titanium alloys, cooper alloys, various aluminum alloys, manganese, magnesium, and the like). Metal-based lattice structures or lattice structures made from suitable composite materials may be used to make hulls, decks of ships or shipping containers. Further materials may include various ceramics or glasses, such as (e.g., silicon, silicon carbide, silicon oxide, boron oxide, silicon nitride, aluminum oxide, and the like). Further materials may include any suitable plastics (e.g., acrylonitrile butadiene styrene (ABS), polylactic acid (PLA), acrylonitrile styrene acrylate (ASA), polyethylene terephthalate (PET), glycolized polyethylene terephthalate (PETG), polycarbonate (PC), high-performance 3D printing plastics such as PEEK, PEKK, ULTEM, polypropylene (PP), nylon, composite plastics, alumide, ultraviolet-sensitive resins, and the like). In general, any material that can be used for forming solid or porous plates may be used for fabricating elements of the lattice structures described herein. For instance, engineered wood products (laminates) could be used for architectural applications while thin polymeric sheets might be used from an impact protection system. Further, various composite materials (e.g., carbon reinforced plastics, reinforced concrete, fiberglass-based materials, ceramic matrix composites, metal matrix composites, paper composite panels, and the like) may be used for fabrication of the lattice structures.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations, and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A lattice structure comprising multiple identical unit cells, each unit cell of the multiple identical unit cells including a plurality of joined plates, wherein the plurality of joined plates is a first plurality of joined plates forming a first unit sub-cell and a second plurality of joined plates forming a second unit sub-cell;

wherein the first unit sub-cell comprises:
a first rectangular prism having side walls comprising four first vertical rectangular plates having a same size and shape, the first rectangular prism comprising corners having internal surfaces and external surfaces;
four corner triangular plates having a same size and shape, each corner triangular plate of the four corner triangular plates is joined to each corner of the first rectangular prism, wherein at least a first edge and a second edge of the each corner triangular plate are joined with the internal surfaces of a corresponding corner of the first rectangular prism forming sides of a triangular pyramid at the each corner of the first rectangular prism;
four center triangular plates having a same size and shape joined to form sides of a rectangular pyramid, with a center of the rectangular pyramid located at a center of the first rectangular prism, wherein each edge of a base of the rectangular pyramid is parallel to a non-joined edge of a corresponding corner triangular plate of the four corner triangular plates; and
eight trapezoidal plates having a same size and shape forming four triangular prisms, wherein each two of the eight trapezoidal plates are joined to form sides of a triangular prism of the four triangular prisms, each triangular prism adjacent to a corresponding triangular pyramid, and further adjacent to the rectangular pyramid;
wherein non-joined edges of the first unit sub-cell are configured to be located at a top or a bottom side of the first unit sub-cell;

wherein the second unit sub-cell comprises:
a second rectangular prism having side walls comprising four second vertical rectangular plates having a same size and shape, the second rectangular prism comprising internal and external surfaces;
eight side triangular plates having a same size and shape, each two of the eight side triangular plates joined to a center portion of a corresponding second vertical rectangular plate of the four second vertical rectangular plates forming four triangular pyramids, wherein each of the four triangular pyramids comprises two of the eight side triangular plates joined to each other, and joined to each one of an internal surface of each of the second vertical rectangular plate of the four second vertical rectangular plates;
eight trapezoidal plates having a same size and shape forming four triangular prisms, wherein each two of the eight trapezoidal plates are joined to form sides of a triangular prism of the four triangular prisms, each triangular prism adjacent to two corresponding triangular pyramids of the four triangular pyramids on opposite sides;

wherein the first unit sub-cell is located either above or below the second unit sub-cell; and wherein non-joined edges of the second unit sub-cell are configured to be located at a top or a bottom side of the second unit sub-cell.

2. The lattice structure of claim 1, further comprising horizontal rectangular plates, wherein the horizontal rectangular plates comprise a first horizontal rectangular plate having a first side and a second side, the first horizontal rectangular plate located above the four first vertical rectangular plates, the first horizontal rectangular plate being joined at the first side with the four first vertical rectangular plates at edges of the four first vertical rectangular plates.

3. The lattice structure of claim 2, wherein the first horizontal rectangular plate is joined at the first side with every edge at the top side of the first unit sub-cell.

4. The lattice structure of claim 3, wherein each unit cell of the multiple identical unit cells further comprises an additional first unit sub-cell being identical to the first unit sub-cell, the additional first unit sub-cell joined at every edge at a top side of the additional first unit sub-cell with the second side of the first horizontal rectangular plate.

5. The lattice structure of claim 4, wherein the horizontal rectangular plates further comprises a second horizontal rectangular plate, the second horizontal rectangular plate joined at a first side of the second horizontal rectangular plate with every edge at a bottom side of the additional first unit sub-cell.

6. The lattice structure of claim 5, wherein every edge at the bottom side of the second unit sub-cell is joined with the second horizontal rectangular plate at a second side of the second horizontal rectangular plate.

7. The lattice structure of claim 6, wherein each unit cell of the multiple identical unit cells further comprises a third horizontal rectangular plate joined at a first side of the third horizontal rectangular plate with every edge at the top side of the second unit sub-cell.

8. The lattice structure of claim 7, wherein each unit cell of the multiple identical unit cells further comprises an additional second unit sub-cell identical to the second unit sub-cell, the additional second unit sub-cell joined at every edge at a top side of the additional second unit sub-cell with a second side of the third horizontal rectangular plate.

9. The lattice structure of claim 8, wherein each unit cell of the multiple identical unit cells further comprises a fourth horizontal rectangular plate joined at a first side of the fourth horizontal rectangular plate with every edge at a bottom side of the additional second unit sub-cell.

10. The lattice structure of claim 9, further comprising a stack of the multiple identical unit cells, wherein a first unit cell of the multiple identical unit cells is configured to be above and adjacent to a second unit cell of the multiple identical unit cells, and wherein the fourth horizontal rectangular plate of the second unit cell is joined at a second side with every edge at the bottom side of the first unit sub-cell of the first unit cell.

11. The lattice structure of claim 9, further comprising a layer of a plurality of unit cells adjacent to each other in a plane at boundaries formed by the four first vertical rectangular plates and the four second vertical rectangular plates.

12. The lattice structure of claim 9, further comprising a stack of joined layers, each layer being a plurality of unit cells adjacent to each other in a plane at boundaries formed by the four first vertical rectangular plates and the four second vertical rectangular plates.

13. The lattice structure of claim 9, wherein at least some of the first or the second plurality of joined plates are formed from one of a metal, a plastic, or a ceramic material, wherein each unit cell of the multiple identical unit cells is in a range of a few nanometers to a few meters.

14. The lattice structure of claim 9, wherein at least some of the first or the second plurality of joined plates includes cavities.

15. The lattice structure of claim 9, wherein at least some of the first or the second plurality of joined plates includes a composite material.

16. The lattice structure of claim 9, wherein at least some of the first or the second plurality of joined plates is formed from one of a dielectric, a semiconductor, or a metal.

17. The lattice of claim 9, wherein the first rectangular prism of the first unit sub-cell and the second rectangular prism of the second unit sub-cell comprises a first square.

18. The lattice structure of claim 17, wherein a base of the rectangular pyramid of the first unit sub-cell comprises a second square.

19. The lattice structure of claim 18, wherein non-joined edges of the triangular prism of the four triangular prisms of the first unit sub-cell form a third square.

20. The lattice structure of claim 19, wherein the second square is the same size as the third square.

21. The lattice structure of claim 1, wherein at least some plates from the first plurality of plates or from the second plurality of plates contain cavities.

* * * * *